US009581885B2

(12) United States Patent
Samejima et al.

(10) Patent No.: US 9,581,885 B2
(45) Date of Patent: Feb. 28, 2017

(54) LIGHT SOURCE APPARATUS AND PROJECTOR

(71) Applicant: USHIO DENKI KABUSHIKI KAISHA, Tokyo (JP)

(72) Inventors: Takanori Samejima, Hyogo (JP); Masashi Okamoto, Hyogo (JP); Fumihiko Oda, Hyogo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 943 days.

(21) Appl. No.: 13/892,175

(22) Filed: May 10, 2013

(65) Prior Publication Data
US 2013/0301013 A1 Nov. 14, 2013

(30) Foreign Application Priority Data
May 11, 2012 (JP) ................................ 2012-109445

(51) Int. Cl.
*F21S 4/00* (2016.01)
*F21V 21/00* (2006.01)
(Continued)

(52) U.S. Cl.
CPC ............ *G03B 21/2033* (2013.01); *F21V 5/04* (2013.01); *G02B 19/0028* (2013.01);
(Continued)

(58) Field of Classification Search
CPC ............ G03B 21/2033; G03B 21/2013; G03B 21/208; F21V 5/04; G02B 19/0057; G02B 19/0025; G02B 19/0028
(Continued)

(56) References Cited

U.S. PATENT DOCUMENTS 8,057,047 B2 * 11/2011 Kim ...................... G03B 21/16
165/146
8,157,398 B2 * 4/2012 Yamamoto ........... G03B 21/204
353/38
(Continued)

FOREIGN PATENT DOCUMENTS

CN 101846250 A 9/2010
CN 102385226 A 3/2012
(Continued)

OTHER PUBLICATIONS

Japan Patent Office, Office Action for Japanese patent application No. No. 2012-109445, Feb. 3, 2016.
(Continued)

*Primary Examiner* — Jason Moon Han

(57) ABSTRACT

A light source apparatus comprises a beam flux conversion optical system for making all the light emitting areas conjugate to one geometrical-optical output image, all the solid light emitting elements being in series connected to each other and fixed to a heat sink to be insulated to one another, circuits on the input and output sides of an electric supply circuit being not insulated, the electric supply circuit including an interface circuit for receiving a modulation amount specifying signal from a host circuit, wherein a ratio of ON time to a switching cycle of the switch element is controlled in a feedback manner so that a difference between current values indicated by the output current signal and a target current signal may become small, and the interface circuit generating analog quantity correlated to the amount of modulation specified by a modulation amount specifying signal through a data insulation transmission unit.

15 Claims, 12 Drawing Sheets

(51) Int. Cl.
  *G03B 21/20* (2006.01)
  *F21V 5/04* (2006.01)
  *G02B 19/00* (2006.01)

(52) U.S. Cl.
  CPC ....... *G02B 19/0057* (2013.01); *G03B 21/208* (2013.01); *G03B 21/2013* (2013.01)

(58) Field of Classification Search
  USPC .............. 362/294, 244, 235, 249.02, 311.02; 353/52, 56; 359/811, 819
  See application file for complete search history.

(56) References Cited

U.S. PATENT DOCUMENTS

| | | | | |
|---|---|---|---|---|
| 2008/0137041 | A1* | 6/2008 | Okamoto | H05B 41/2887 353/85 |
| 2010/0110391 | A1* | 5/2010 | Chu | G03B 21/16 353/52 |
| 2012/0050696 | A1 | 3/2012 | Yanase et al. | |
| 2012/0249972 | A1* | 10/2012 | Kurosaki | G03B 21/2013 353/31 |

FOREIGN PATENT DOCUMENTS

| | | |
|---|---|---|
| JP | S63-138537 A | 6/1988 |
| JP | H07-022654 A | 1/1995 |
| JP | H10-133303 A | 5/1998 |
| JP | 2001-142141 A | 5/2001 |
| JP | 2002-268140 A | 9/2002 |
| JP | 2004-252112 A | 9/2004 |
| JP | 2004-341105 A | 12/2004 |
| JP | 2004-341554 A | 12/2004 |
| JP | 2005-129877 A | 5/2005 |
| JP | 2007-003914 A | 1/2007 |
| JP | 2008-234842 A | 10/2008 |
| JP | 2010-231063 A | 10/2010 |
| JP | 2011-076781 A | 4/2011 |
| JP | 2011-113935 A | 6/2011 |
| JP | 2011-130543 A | 6/2011 |
| JP | 2011-134669 A | 7/2011 |
| JP | 2012-028048 A | 2/2012 |

OTHER PUBLICATIONS

State Intellectual Property Office of the People's Republic of China, Search Report for Chinese patent application No. 201310172472.0, Nov. 17, 2015.

* cited by examiner

FIG. 5
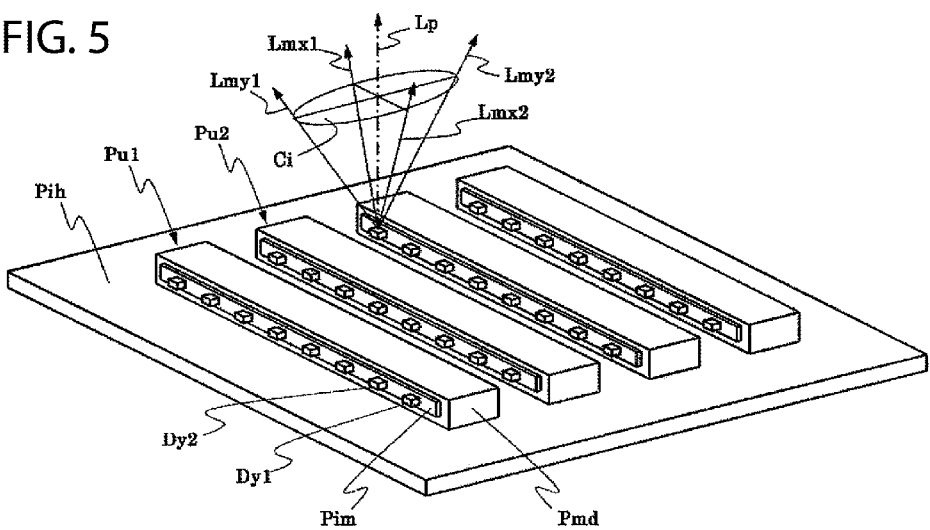
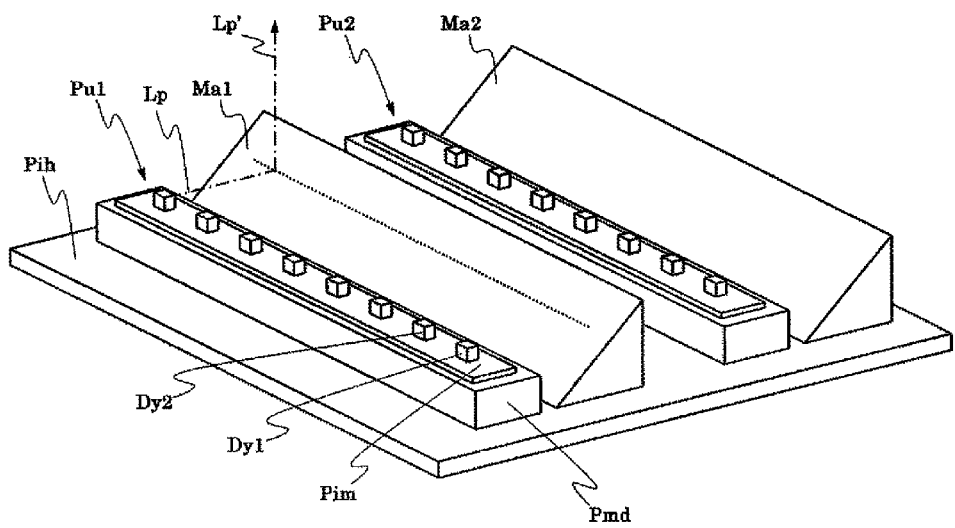
FIG. 6

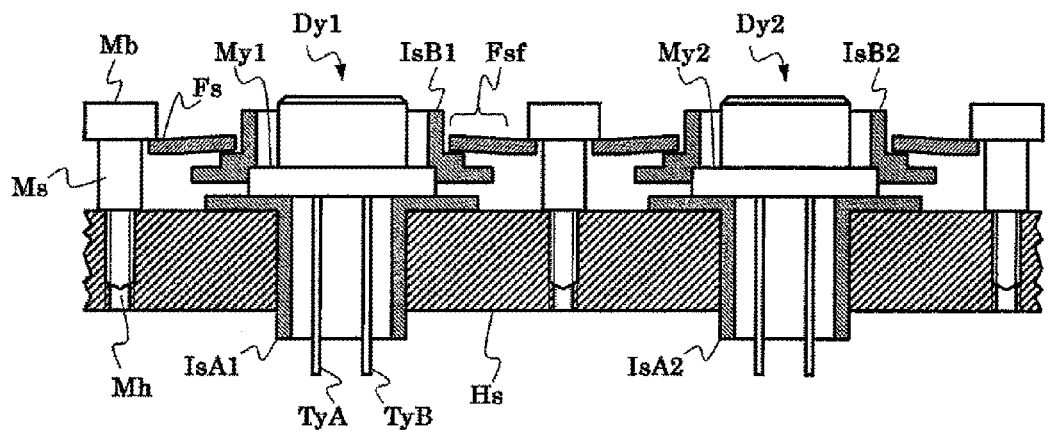
FIG. 10
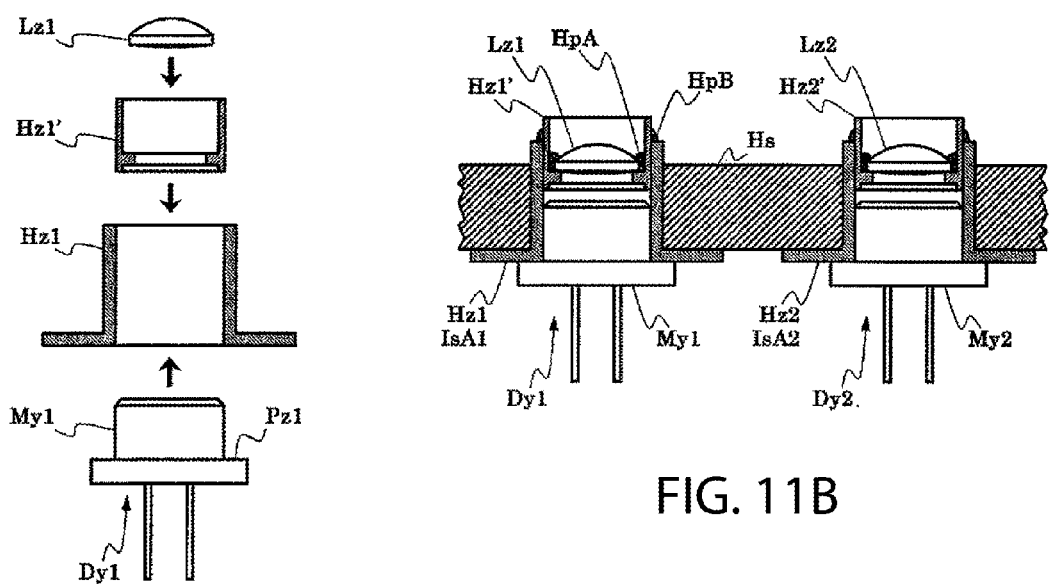
FIG. 11A
FIG. 11B

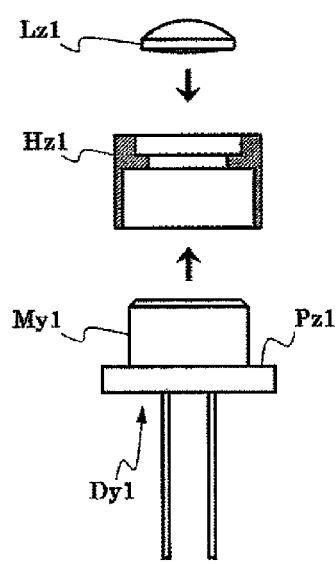
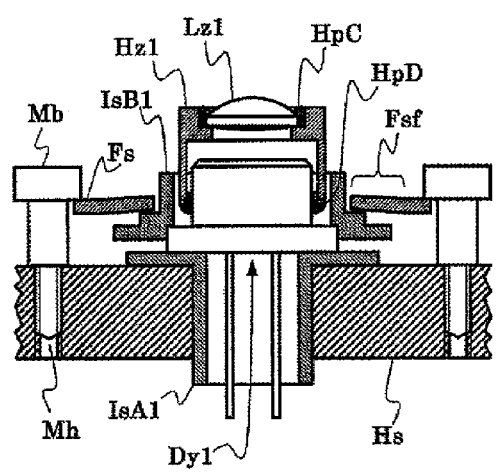
FIG. 12A
FIG. 12B

LIGHT SOURCE APPARATUS AND PROJECTOR

CROSS-REFERENCES TO RELATED APPLICATION

This application claims priority from Japanese Patent Application Serial No. 2012-109445 filed May 11, 2012, the contents of which are incorporated herein by reference in its entirety.

TECHNICAL FIELD

The present invention relates to a projector and a light source apparatus which can be used for an optical device such as a projector, in which solid light emitting elements such as semiconductor laser devices are used.

BACKGROUND

For example, a high intensity discharge lamp (HID lamp) such as a xenon lamp and an extra-high pressure mercury lamp has been used so far, in a projector for image display such as a DLP™ projector and a liquid crystal projector, and a photo mask exposure apparatus. As an example, the principle of such a projector is shown in FIG. 16 (reference: Japanese Patent Application Publication No. 2004-252112 etc.).

As described above, light from a light source (UsA), which is made up of a high intensity discharge lamp etc., is inputted into an incident end (PmiA) of a light uniformizing unit (FmA) by, for example, using a condensing unit (not shown), which is made up of a concave reflection mirror, a lens, etc., and is outputted from an emission end (PmoA) thereof. Here, for example, an optical guide can be used as the light uniformizing unit (FmA), which is also called a rod integrator, a light tunnel, etc., and is formed of a prism made from light transmissive material such as glass, resin, etc., wherein while the light inputted into the incident end (PmiA) is repeatedly and totally reflected on side faces of the light uniformizing unit (FmA) according to the principle, which is the same as that of an optical fiber, it propagates inside the light uniformizing unit (FmA), thereby functioning so that the illuminance on the emission end (PmoA) is sufficiently uniformized even if distribution of the light inputted into the incident end (PmiA) has unevenness.

An illumination lens (Ej1A) is arranged so that a quadrangle image of the emission end (PmoA) is formed on a two-dimensional light amplitude modulation element (DmjA), whereby the two-dimensional light amplitude modulation element (DmjA) is illuminated by light outputted from the emission end (PmoA). However, in FIG. 16, a mirror (MjA) is arranged between the illumination lens (Ej1A) and the two-dimensional light amplitude modulation element (DmjA). And the two-dimensional light amplitude modulation element (DmjA) modulates light on a pixel to pixel basis according to an image signal so that the light is directed so as to enter the projection lens (Ej2A), or light is directed so as not to enter there, whereby an image is displayed on a screen (Tj).

Since the above-described two-dimensional light amplitude modulation element is also called a light valve, and in the case of the optical system shown in FIG. 16, a DMD™ (Digital Micromirror Device) is generally used as the two-dimensional light amplitude modulation element (DmjA).

The so-called fly eye integrator may be used as the light uniformizing unit, instead of the above-described optical guide. FIG. 17 shows the principle of a projector using this light uniformizing unit, as an example (reference: Japanese Patent Application Publication No. 2001-142141 etc.).

Light from a light source (UsB), which is made up of a high intensity discharge lamp etc., is inputted, as approximately parallel light flux, into an incident end (PmiB) of the light uniformizing unit (FmB) which is made up of a fly eye integrator, by using a collimator unit (not shown), which consists of a concave reflection mirror, a lens, etc. and is outputted from an emission end (PmoB). Here, the light uniformizing unit (FmB) is made up of a combination of an upstream fly eye lens (F1B) on an incident side, a downstream fly eye lens (F2B) on a light emission side, and an illumination lens (Ej1B). The upstream fly eye lens (F1B) and the downstream fly eye lens (F2B) are respectively formed by arranging, in vertical and horizontal directions, many quadrangle lenses whose focal distance is the same as one another and whose shape is the same as one another.

Each lens of the upstream fly eye lens (F1B), and each corresponding lens of the downstream fly eye lens (F2B), which is located downstream of each lens of the upstream fly eye lens (F1B), form an optical system called Koehler illumination, so that many Koehler illumination optical systems are aligned in a matrix in a plane. Generally, such a Koehler illumination optical system is made up of two lenses, wherein when the upstream fly eye lens collects light and illuminates an object face (a face to be illuminated), the upstream lens does not form an image of a light source on the object face, but forms an image of the light source on a center face of the downstream lens, whereby the object face is uniformly illuminated by arranging the downstream lens so as to form a quadrangle contour image of the upstream fly eye lens on the object face. The downstream lens functions so as to prevent a phenomenon in which an illuminance of a circumference part of the quadrangle object face falls depending on the size, if the downstream lens is not provided and a light source is not a perfect point light source but has a limited size, whereby it is possible to form a uniform illuminance on even the circumference part of the quadrangle object face by the downstream lens, independent of the size of the light source.

Here, since the optical system shown in FIG. 17 is configured based on case where approximately parallel light flux is inputted into the light uniformizing unit (FmB), an interval between the upstream fly eye lens (F1B) and the downstream fly eye lens (F2B) is set so as to become equal to those focal distances, so that an image of the object face of the uniform illumination of a Koehler illumination optical system is formed at infinity. However, since an illumination lens (Ej1B) is arranged downstream of the downstream fly eye lens (F2B), the object face can be pulled near on the focal plane of the illumination lens (Ej1B) from the infinity. Since the Koehler illumination optical systems arranged in a matrix in a plane are parallel to an incident light axis (ZiB) and light flux is approximately axisymmetrically inputted therein with respect to each central axis so that the output light flux is also approximately axisymmetrical, and outputs of all the Koehler illumination optical systems are imaged on the same object face on the focal plane of the illumination lens (Ej1B) because of the nature of lens, i.e., a Fourier transform of a lens, in which light rays entering a lens face at the same angle as one another, are refracted so as to be directed to the same point on a focal plane without depending on the incidence position on the lens face.

As a result, all the illuminance distributions in each lens face of the upstream fly eye lens (F1B) are overlaid, so that one synthesized quadrangle image, whose illuminance distribution is more uniform than that in case of one Koehler illumination optical system, is formed on the incident light axis (ZiB). The two-dimensional light amplitude modulation element (DmjB), which is an illumination object, is illuminated by light outputted from the emission end (PmoB) when a two-dimensional light amplitude modulation element (DmjB) is arranged at a position of the synthesized quadrangle image. However, a polarization beam splitter (MjB) is arranged between the illumination lens (Ej1B) and the two-dimensional light amplitude modulation element (DmjB) so that the light is reflected towards the two-dimensional light amplitude modulation element (DmjB) when the light is illuminated. And the two-dimensional light amplitude modulation element (DmjB) performs a modulation and reflection so as to or so as not to rotate the polarization direction of the light by 90 degrees on a pixel to pixel basis according to an image signal, whereby only the rotated light passes through the polarization beam splitter (MjB), and enters the projection lens (Ej3B), so that an image may be displayed on a screen (Tj).

In addition, in the case of the optical system shown in FIG. 17, in general, a LCOS™ (Liquid Crystal on Silicon) is used as the two-dimensional light amplitude modulation element (DmjA) in many cases. In the case of such a liquid crystal device, since only a component of light in a specified polarization direction can be modulated effectively, although a component parallel to the specified polarization direction is usually passed therethrough as it is, only a component perpendicular to the specified polarization direction is rotated by 90 degrees with respect to the polarization direction, so that the polarized-light alignment functional device (PcB) for making all the light effectively usable is inserted, for example, downstream of the downstream fly eye lens (F2B). Moreover, a field lens (Ej2B) is inserted immediately upstream of the two-dimensional light amplitude modulation element (DmjB) so that approximately parallel light may enter the two-dimensional light amplitude modulation element (DmjB).

In addition to the reflection type of the two-dimensional light amplitude modulation element shown in FIG. 17, a transmissive liquid crystal device (LCD) may be used as the two-dimensional light amplitude modulation element in the optical arrangement which is suitable therefor (reference: Japanese Patent Application Publication No. H10-133303 etc.).

Generally, for example, a dynamic color filter such as a color wheel is arranged upstream or downstream of the light uniformizing unit in a projector in order to display a color image, and the two-dimensional light amplitude modulation element is illuminated with color sequential light flux of R, G and B (Red, Green, Blue), whereby color display is realized in time dividing manner, or a dichroic mirror or a dichroic prism is arranged downstream of the light uniformizing unit, so that the two-dimensional light amplitude modulation element, which is independently provided in each color, is illuminated with light which is separated into the three primary colors of R, G and B, and a dichroic mirror or a dichroic prism for performing color synthesis of the modulated light flux of the primary colors R, G and B is arranged. However, for ease of explanation, in FIGS. 17 and 18, these elements are omitted.

However, the high intensity discharge lamp has drawbacks such as low conversion efficiency from applied power to light power, i.e., great calorific, and a short life span. A solid light source such as an LED and a semiconductor laser attracts attention in recent years as an alternative light source, in which these drawbacks are solved. Although of these light sources, in the LED, calorific loss thereof is smaller and an operating life span thereof is longer than those of the discharge lamps, since there is no directivity of light emitted therefrom as in the discharge lamps, there is a problem that the usage efficiency of light is low when it is used in the above-mentioned projector or exposure apparatus, in which only light in specific direction can be used. On the other hand, a semiconductor laser has high directivity in addition to a small calorific loss and a long operating life spam as in such an LED, so that there is an advantage that the usage efficiency of light is high, when it is used in the above-mentioned projector, exposure apparatus, etc. in which only light in a specific direction can be used.

When an optical device such as a projector is realized by using a solid light emitting element without regard to such a type of light sources, i.e. a semiconductor laser or a light emitting diode, since the light emission amount of one element thereof is small, it is necessary to mount two or more elements so as to realize predetermined light intensity by combining the light from each solid light emitting element. For the reasons, for example, Japanese Patent Application Publication No 2011-076781 discloses that two or more light sources are arranged so as to form rows and columns, the light source group is held at a light source holding member so that the optical axes of the light sources may be approximately parallel to one another, and the light source holding member is thermally connected to a heat sink through a heat transfer member. Moreover, for example, Japanese Patent Application No. 2005-129877 discloses a device in which two or more light emitting diodes are in series connected to one another.

When current is simultaneously applied to two or more solid light emitting elements, the series connection thereof becomes advantageous compared with the parallel connection thereof in view of cost reduction. There is a difference therebetween, as set forth below. That is, although, in case of the series connection, the voltage to be applied to all the connected solid light emitting elements becomes high since voltage for the number of connected solid light emitting elements is required, but current for only one solid light emitting element is enough to be passed therethrough, so that small current may be sufficient. On the other hand, although, in the case of the parallel connection, voltage for only one solid light emitting element is enough to be applied to all the connected solid light emitting elements, so that low voltage may be sufficient, but current to be passed therethrough becomes large since current for the number of the connected solid light emitting elements is required. It is known that in general, the efficiency of a circuit, in which a large current is passed, tends to be worse than that of a circuit, in which high voltage is generated, and the cost of the circuit, in which large current is passed, is higher than that of the circuit, in which high voltage is generated.

Unlike a white light source such as the high intensity discharge lamp, a solid light emitting element such as a light emitting diode and a semiconductor laser is a monochromatic light source, so that, for example, as disclosed in Japanese Patent Application Publication No. 2002-268140, it is necessary to prepare a solid light emitting element for each of R-G-B colors for colorization. Or instead of preparing such solid light emitting elements for two or more colors, for example, Japanese Patent Application Publication No. 2004-341105 discloses that a color wheel, in which phosphor layers are separately formed, and each layer emits fluorescence of R, G, or B color, is separately formed, is irradiated with ultraviolet light emitted from a solid light emitting element, which is a monochromatic light source, thereby forming color sequential light beam flux made up of each of R, G, and B colors. In addition, for example, Japanese Patent Application No. 2010-231063 discloses a color wheel, in which a phosphor layer for emitting fluorescence of each of R and G colors and a layer for transmitting or diffusing B color are formed in a divided manner, is irradiated with light emitted from a solid light emitting element which is a monochromatic light source and which emits blue light, thereby forming color sequential beam flux of each of R, G, and B colors. In addition, the solid light emitting element for emitting monochromatic light, and the color wheel which is the dynamic color conversion element, are used in order to simplify the structure thereof and to reduce the cost thereof, instead of using a solid light emitting element for two or more colors.

As mentioned above, although cost reduction of the light source device using a solid light emitting element has been attempted, it has not been sufficient. For example, in the above-mentioned case where the solid light emitting element which emits monochromatic light and a dynamic color transformation device are used, since the brightness of each of R, G, and B colors is not simply proportional to the brightness of incident monochromatic light, if light modulation is simply performed, the balance of each color will be lost, so that it is necessary to make a delicate balance adjustment of each color in order to compensate influence of deterioration of a phosphor. Or a delicate adjustment of balance of each color is required to perform an operation for quantitatively dropping the brightness of each of R, G, and B color according to the dimness in case of a dim video image, and to perform an operation for quantitatively dropping the brightness of G and B colors according to reddishness etc., in case of a reddish video image, when a capability of fine gradation reproduction is acquired under a condition where the number of reproduciable gradation levels of the above-mentioned two-dimensional light amplitude modulation element, is limited. However, when actually performing this operation, it is necessary to change the brightness of monochromatic light according to timing when colors are switched in dynamic color conversion. In this regard, the cost of the conventional light source apparatus is greatly depending on whether or not to insulate a host circuit which generates a modulation amount specifying signal which is a target control value of the brightness of monochromatic light, from an electric supply circuit which passes current through a solid light emitting element, and moreover depending on how the modulation amount specifying signal is transmitted in the case where they are insulated from each other. However, in a conventional light source equipment, the structure, which is optimal for such cost reduction, has not been configured. Also, refer to Japanese Patent Application Publication No. 2004-341105.

SUMMARY

It is an object of the present invention to offer a projector and a light source apparatus, in which electrical insulation is appropriately provided mutually among solid light emitting elements, a heat sink to which the solid light emitting elements are fixed, an input side and an output side of an electric supply circuit which supplies electric power to all the solid light emitting elements, and a host circuit which generates a modulation amount specifying signal, whereby required safety is secured, and cost reduction is attained.

A light source apparatus according to an first embodiment of the invention comprises a light emitting element aggregate (Ud) including two or more solid light emitting elements (Dy1, Dy2, . . . ), and an electric supply circuit (Ub) for supplying electric power to the light emitting element aggregate (Ud), wherein the light emitting element aggregate (Ud) has a beam flux conversion optical system (Uf) for making a light emitting area (Ky1, Ky2, . . . ) of each of all the solid light emitting elements (Dy1, Dy2, . . . ) conjugate to one geometrical-optical output image (Kf), wherein all the solid light emitting elements (Dy1, Dy2, . . . ) are in series connected to each other thereby forming a light emitting element series connection circuit (Ns), and are fixed to a heat sink (Hs) so as to be electrically insulated to each other, wherein the electric supply circuit (Ub) has a converter circuit (Ex) for stepping down an output voltage of a DC power supply (Uv) connected to an upstream side of the electric supply circuit (Ub), the output voltage Vo generated by the converter circuit (Ex) being applied to the light emitting element series connection circuit (Ns), and the converter circuit (Ex) includes at least one switch element (Qx) and a circuit on a input side thereof and a circuit on an output side thereof are not electrically insulated from each other, wherein the electric supply circuit (Ub) further includes an output current detecting unit (Ix) which detects output current Io of the converter circuit (Ex) flowing through the light emitting element series connection circuit (Ns), and generates an output current signal (S1), an electric supply control circuit (Fx) for controlling the converter circuit (Ex), and an interface circuit (Tx) for receiving a modulation amount specifying signal (Sm) from a host circuit (Uh), wherein the electric supply control circuit (Fx) is configured to control a ratio of ON time to a switching cycle of the switch element (Qx) in a feedback manner so that a difference between a current value which is indicated by the output current signal (S1) and a current value which is indicated by a target current signal (Sj) inputted from the interface circuit (Tx) may become small, and wherein the interface circuit (Tx) has a data insulation transmission unit (At) for generating analog quantity, which is electrically insulated from the modulation amount specifying signal (Sm), and the interface circuit (Tx) generates the target current signal (Sj) for the analog quantity correlated to the amount of modulation specified by the modulation amount specifying signal (Sm), through the data insulation transmission unit (At).

According to a second embodiment of the present invention, in the light source apparatus, the solid light emitting element (Dy1, Dy2, . . . ) is in a shape of a chip, the two or more solid light emitting elements (Dy1, Dy2, . . . ) are fixed to an insulation material base plate (Pih), and the insulation material base plate (Pih) is fixed to the heat sink (Hs).

According to a third embodiment of the present invention, in the light source apparatus, the solid light emitting element (Dy1, Dy2, . . . ) is configured so as to be covered with an external enclosure made up of a metal casing portion (My1, My2, . . . ) and a light transmission window portion (Wy1, Wy2, . . . ), wherein the solid light emitting element (Dy1, Dy2, . . . ), the heat sink (Hs), and the fixing member (Fs) are arranged so that the heat sink (Hs) and the fixing member (Fs) sandwich the metal casing part (My1, My2, . . . ) through an insulating member (IsA1, IsA2, . . . ) and an insulating member (IsB1, IsB2, . . . ), from a light emitting side thereof and an opposite side thereto, and wherein the fixing member (Fs) has elasticity, and the solid light emitting element (Dy1, Dy2, . . . ) is fixed to the heat sink (Hs) by fixing the fixing member (Fs) to the heat sink (Hs).

According to a fourth embodiment of the present invention, in the light source apparatus, the beam flux conversion optical system (Uf) is configured by collimating lenses (Lz1, Lz2, . . . ) provided so as to correspond to the respective solid light emitting elements (Dy1, Dy2, . . . ), lens holders (Hz1, Hz2, . . . ) to which the collimating lenses (Lz1, Lz2, . . . ) are fixed, are set on the metal casing portions (My1, My2, . . . ), so that light parallel to a specific direction with respect to reference planes (Pz1, Pz2, . . . ) of the metal casing portions (My1, My2, . . . ) may be emitted.

According to a fifth embodiment of the present invention, in the light source apparatus, the lens holders (Hz1, Hz2, . . . ) serves as the insulating members (IsA1, IsA2, . . . ).

A projector according to a sixth embodiment of the present invention, an image is projected and displayed by using the above light source apparatus.

A projector according to a seventh embodiment of the present invention, the DC power supply (Uv) generates output voltage by converting commercial power (Ps), wherein the output of the DC power supply (Uv) is not electrically insulated from the commercial power source (Ps).

Thus, it is possible to offer a light source apparatus and a projector in which cost reduction thereof is attained while required safety is secured.

BRIEF DESCRIPTION OF THE DRAWING

Other features and advantages of the present light source apparatus and the present projector will be apparent from the ensuing description, taken in conjunction with the accompanying drawings, in which:

FIG. 5 is a schematic diagram showing an aspect of part of a light source apparatus according to an embodiment of the present invention;

FIG. 6 is a schematic diagram showing an aspect of part of a light source apparatus according to an embodiment of the present invention;

FIG. 10 is a schematic diagram showing an aspect of part of a light source apparatus according to an embodiment of the present invention;

FIGS. 11A and 11B are schematic diagrams showing an aspect of part of a light source apparatus according to an embodiment of the present invention;

FIGS. 12A and 12B are schematic diagrams showing an aspect of part of a light source apparatus according to an embodiment of the present invention;

DESCRIPTION

A term "conjugate" in an explanation of the present invention is used as a general term in the geometric optics field, and, for example, "when A and B are conjugate to each other", it means that A is imaged on B or B is imaged on A, by an action of an optical element such as a lens having an image formation function, based on at least the paraxial theory. Here, A and B are images and include, as objects, not only an isolated point image but also a set of a plurality of point images or a spread image made up of continuously distributed point images.

Here terms "point image" or "image point (that is, "image")" is used as a general term in the geometric optics field, and includes any one of the following cases: where light is actually emitted from the point; where when light converges toward the point and when a screen is placed, a bright point is reflected; where light is viewed so that light converges toward the point (however, the point is located inside an optical system, so that a screen cannot be placed therein); and where light is viewed so that light is emitted from the point (however, the point is located inside an optical system, so that a screen cannot be placed therein) and they are not distinguished from one another. Moreover, it is considered an image is formed at infinity in case of parallel light flux.

Even if an output image (Kf) accompanies a phenomenon where even if it is a condition on which a point image should be produced in view of a geometrical-optical design, actually not such a point image is formed by a diffraction phenomenon but a condensing region spreading in a certain area is formed, a phenomenon where blurring arises due to an aberration and focus adjustment error in image formation or a defect of an optical element such as a lens, and assembly errors, etc., so that a condensing region spreading in an area larger than the limit of a condensing region produced due to a diffraction phenomenon is merely formed, and/or a phenomenon where the position of the image point is shifted from an ideal position in the design due to assembly adjustment errors of an optical system, etc., as long as the generated output image can be effectively used, it is possible to disregard these phenomena, in an main body apparatus such as a projector in which the present light source apparatus is installed.

Figure 1:
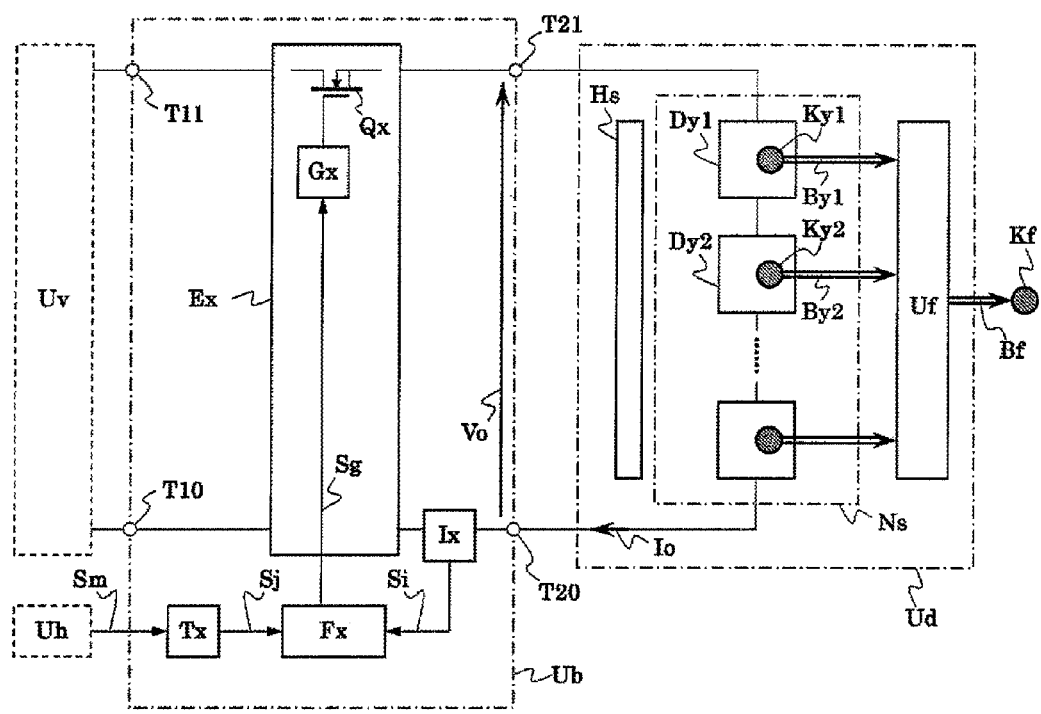
FIG. 1 is a schematic block diagram of a light source apparatus according to an embodiment of the present invention.

Description of a light source apparatus according an embodiment of the present invention will be given below referring to FIG. 1, which is a schematic block diagram showing the present light source apparatus. Each of solid light emitting elements (Dy1, Dy2, . . . ) which form a light emitting element aggregate (Ud) is, for example, a semiconductor laser device, and they are in series connected to one another thereby forming a light emitting element series connection circuit (Ns). Furthermore, in order to discharge heat generated when current is passed through the light emitting element series connection circuit (Ns), each of the solid light emitting elements (Dy1, Dy2, . . . ) is fixed to a heat sink (Hs) in a state where they are electrically insulated from one another, so that a required thermal contact may be realized.

Moreover, the light emitting element aggregate (Ud) is provided with a beam flux conversion optical system (Uf). This beam flux conversion optical system (Uf) receives bundles of rays (By1, By2, . . . ) from light emitting areas (Ky1, Ky2, . . . ) of the respective solid light emitting elements (Dy1, Dy2, . . . ), and changes them to and outputs a bundle of output rays (Bf), whereby each light emitting area (Ky1, Ky2, . . . ) is configured so as to form one common output image (Kf) as a whole. In addition, an image point at infinity may be formed as the output image (Kf) of the present light source apparatus. This is because the image point at infinity can be easily converted to an image point at an arbitrary position by using a convex lens etc., if needed, in a main body apparatus such as a projector in which the present light source apparatus is installed. As a matter of course, a core end face of one end of an optical fiber may be placed at this image point position so as to receive light, whereby light emitted from a core end face of the other end of the optical fiber may be used.

In addition, although the bundle of rays from each light emitting area (Ky1, Ky2, . . . ) needs to be collimated when the image point is at infinity as described above, in case where the bundle of rays after the collimating cannot be made thick enough, it becomes inevitably diverging light, and in a precise sense, it becomes impossible to form an image of all the bundles of rays at one image point by using a convex lens etc. In such case, since principal rays of the bundles of rays from respective light emitting areas (Ky1, Ky2, . . . ), i.e., the central rays of the bundles of rays, are parallel to one another, so as to form a telecentric optical system on an output side thereof, although an exit pupil is generated at an image point position corresponding to the infinity, which is originally assumed when a convex lens etc. is inserted on a downstream side thereof, if the size thereof is sufficiently small and it can be efficiently used in the main body apparatus such as a projector, it may be treated as the above described output image (Kf).

An electric supply circuit (Ub) for passing predetermined current through the light emitting element series connection circuit (Ns) includes a converter circuit (Ex) capable of stepping down voltage of a DC power supply (Uv), which is connected to the upstream side thereof, to lower voltage, wherein output voltage Vo of the converter circuit (Ex) is applied to the light emitting element series connection circuit (Ns) from its output nodes (T20, T21). The converter circuit (Ex) has a non-insulating structure in which input nodes (T10, T11) and the nodes (T20, T21) are not insulated therebetween by a transformer. For example, the output voltage Vo is generated by a switching operation of a switch element (Qx), which is an FET, and an electric supply control circuit (Fx) is configured so as to generate a gate drive signal (Sg) for making the switch element (Qx) into an ON state or an OFF state, and it is given to the switch element (Qx) through a gate drive circuit (Gx).

Current, which flows through the light emitting element series connection circuit (Ns), i.e., output current Io of the converter circuit (Ex), is detected by an output current detecting means (Ix), and an output current signal (S1), which is correlated with the size of the output current Io, is generated. On the other hand, a target value of the output current Io is given to the electric supply control circuit (Fx) by the target current signal (Sj), which is correlated with the size of the target value, and this electric supply control circuit (Fx) controls the duty cycle ratio of a switching operation of the switch element (Qx), namely, the ratio of ON time to a switching cycle, in a feedback manner so that a difference between the output current Io and the target value may become small.

The main body apparatus such as a projector in which a host circuit (Uh), i.e., the light source apparatus, is installed, (or specifically a control circuit which is included in main body apparatus and which manages the generation of an image signal), generates a modulation amount specifying signal (Sm) for specifying the size of the target current signal (Sj), in order to realize delicate adjustment etc. of the balance of each color in order to achieve the above-described matters, and in this light source apparatus, an interface circuit (Tx) receives this modulation amount specifying signal (Sm). In the interface circuit (Tx), it is changed into the analog target current signal (Sj), which has the size specified by the modulation amount specifying signal (Sm), by a data insulation transmission unit for generating analog quantity, which is electrically insulated from the modulation amount specifying signal (Sm).

In the light source apparatus according to the embodiment of the present invention, which is configured as described above, since one output image (Kf) is formed from the bundles of rays (By1, By2, . . . ) from the two or more solid light emitting elements (Dy1, Dy2, . . . ), it is possible to substantially regard an output of this light source apparatus as a point light source, whereby when this light source apparatus is used as a light source for a projector etc., the utilization efficiency of light can be raised at maximum.

Moreover, since the solid light emitting elements (Dy1, Dy2, . . . ) are in series connected to one another, when all the solid light emitting elements, which are in series connected to one another, are driven by only one common current loop, the output current Io from the electric supply circuit (Ub) is suppressed to the minimum, so that it becomes unnecessary to use high cost circuit elements for large current, whereby the cost thereof can be reduced. Furthermore, since joule loss of the circuit element produced by current can be suppressed low, the efficiency of the circuit is improved, heat generation can be suppressed, required cooling capacity can be set up low, and cost reduction can be attained. Furthermore, since the converter circuit (Ex) may not be insulated, it becomes unnecessary to make insulation between a system which is electrically conductive to an input side, i.e., the nodes (T10, T11), and a system, which is electrically conductive to an output side, i.e., the nodes (T20, T21), by using, for example, a transformer etc. so that cost reduction thereof can be attained.

In the light source apparatus according to the embodiment of the present invention, because of an aspect of reduction of joule loss and elimination of a transformer for insulation, a miniaturization and a weight saving of the present light source apparatus or the main body apparatus such as a projector etc. in which the present light source apparatus is installed, can be attained in addition to cost reduction thereof.

In addition, for example, if the voltage of each solid light emitting element (Dy1, Dy2, . . . ) is 4.5 V, and the number of the solid light emitting elements, which are in-series connected to one another, is fifty (50), voltage to be applied to both ends of the light emitting element series connection circuit (Ns) will be set to 225 V. Therefore, it is necessary to prepare the DC power supply (Uv), for outputting voltage, in which a margin for performing stable control at high speed, is added to the above voltage, for example, approximately 270 V. Moreover, when the heat sink (Hs) is made from conducting material such as metal and all the solid light emitting elements (Dy1, Dy2, . . . ) are fixed to the one heat sink (Hs), since with respect to electric insulation which is made to the solid light emitting elements (Dy1, Dy2, . . . ), there is a possibility that the voltage of up to 225 V may be applied thereto through the heat sink (Hs), the durability, which corresponds to this voltage, is required for electric insulation which is made to the solid light emitting elements (Dy1, Dy2, . . . ).

In addition, with respect to each of the solid light emitting elements (Dy1, Dy2, . . . ), which are in series connected to one another in the light emitting element series connection circuit (Ns), for example, a package, in which two or more solid light emitting elements connected in parallel to one another are accommodated, may be used as the solid light emitting elements for the light source apparatus according to the embodiment of the present invention.

In general, with respect to a solid light emitting element such as a semiconductor laser device and a light emitting diode, since voltage generated between terminals thereof is different depending on every solid light emitting element due to manufacture variation etc., even if the same current is passed therethrough, when two or more elements are in parallel connected to one another, there is a possibility that a remarkable imbalance of current may occur. Therefore, although the light source apparatus according to an embodiment of the present invention is based on the premise that the solid light emitting elements (Dy1, Dy2, . . . ) are respectively connected in series to one another, where one package in which two or more solid light emitting elements are accommodated and connected in parallel to one another, is supplied by a maker, since the respective solid light emitting elements contained in the package are formed on one semiconductor base plate, or since the solid light emitting elements whose characteristics are equal to one another are picked up, so that there may be no problem even if they are connected in parallel, and further they are placed in the same thermal environment by accommodating them in the same package, it is not necessary to think about the parallel connection, so that they can be regarded as one solid light emitting element.

Similarly, when the solid light emitting elements whose characteristics are equal to one another are picked up, combined and connected in parallel to one another so that there may be no problem even if they are connected in parallel and further the thermal contacts of all the solid light emitting elements in the combined group are made good and they are put in the same thermal environment, it is possible to regard the group as one solid light emitting element so that they can be used as solid light emitting elements of the light source apparatus according to the present invention.

There is an upper limit to the number of the solid light emitting elements (Dy1, Dy2, . . . ) which can be included in the light emitting element series connection circuit (Ns). When the number of the solid light emitting elements contained in the light emitting element series connection circuit (Ns) is increased one by one, and the voltage to be applied to the light emitting element series connection circuit (Ns) becomes approximately equal to the voltage of the DC power supply (Uv), the number of the solid light emitting elements cannot be increased to more than that. In fact, if a margin, with which stable control at high speed is performed, is calculated thereon, it is desirable that the number thereof be controlled so that the voltage applied to the light emitting element series connection circuit (Ns) whose series connection number is the limit, may become approximately 80% of the voltage of the DC power supply (Uv).

Since there is characteristic variation among such solid light emitting elements (Dy1, Dy2, . . . ), which are contained in the light emitting element series connection circuit (Ns), when there are two or more light emitting element series connection circuits (Ns), even if the number of the solid light emitting elements (Dy1, Dy2, . . . ) contained in each of them is the same, current which flows therethrough does not generally become the same even if the same voltage is applied thereto. Therefore, if it is necessary to control the current which flows through each of the light emitting element series connection circuits (Ns), so as to be a desired value, the usage in which two or more light emitting element aggregates (Ud) are in parallel connected to one electric supply circuit (Ub) because the number of the solid light emitting elements to be connected exceeds the series connection limit number, is inappropriate. In such case, it is possible to solve the problem by connecting in parallel a pair of one electric supply circuit (Ub) and the one light emitting element aggregate (Ud) to the DC power supply (Uv).

However, electric power is supplied from the one electric supply circuit (Ub), to two or more pairs connected in parallel to each other, each of which consists of the light emitting element series connection circuit (Ns) and a switch device connected in series thereto, whereby the usage, in which control is performed so as to always select only one of the switching devices to be set to ON, is possible. In this case, usage, in which a pattern of current which flows through each light emitting element series connection circuit (Ns) is independently set, is also possible, by changing the kind of solid light emitting element to be connected (for example, luminescent color) for every group, or by changing the modulation amount specifying signal (Sm) according to the switching device to be selected. Here, an FET etc. is suitable as a switching device to be used, and with respect to FIG. 1, what is necessary is just to insert this switching device in between the light emitting element series connection circuit (Ns) and the node (T20) on a low voltage side.

In addition, in the case of the light emitting element series connection circuit (Ns) in which many solid light emitting elements are in series connected to one another, when even one of the solid light emitting element is broken in an open mode, there is a problem that the whole light emitting element series connection circuit (Ns) will be broken down in the open mode, so that it may become unusable. In order to solve this problem, for example, if it is considered that two or more groups of the light emitting element series connection circuit (Ns) are in series connected to one another by regarding the series connection part of one or more solid light emitting elements as one group, when a shunt device is connected in parallel to each group, and the shunt device of the group, in which the solid light emitting element, which has been broken in the open mode exists, is turned into an ON state, i.e., a shunt status, since current is bypassed and the series connection is recovered as a whole, it is possible to avoid the problem that the entirety thereof becomes unusable.

Although, for example, an element, which has control terminals such as SCR (namely, thyristor) and FET, can also be adopted as a shunt device to be used, an element such as an SIDAC (Trademark) or an SSS, which is a two terminal element, may be suitable therefor, wherein although an OFF state is maintained until the voltage generated between the terminals exceeds the threshold, when it exceeds the threshold, it is transited to an ON state so that current starts flowing therethrough, and as long as prescribed current flows therethrough, the ON state is maintained. Or, an element such as a zener diode, may be suitable therefor, in which when the voltage generated between the terminals rises, the impedance between the terminals falls rapidly so that the threshold (namely, zener voltage) is substantially maintained. Upon selection of the two terminal element, what is necessary is just to select an element, which has a threshold, by appropriate margin voltage for a stable operation, higher than voltage generated in the entire solid light emitting element contained in one group, when output current Io is passed therethroguh.

For example, when each solid light emitting element is a semiconductor laser whose forward voltage maximum value is 5.3 V, and the fifty semiconductor lasers are in series connected to one another so as to form the light emitting element series connection circuit (Ns), for example, on supposition that a total of 25 groups, each of which is formed of two series-connected semiconductor lasers, are in series connected to one another, if a zener diode is in parallel connected to each group, for example, what is necessary is just to select a zener diode which has zener voltage of 11 V, by expecting the margin voltage of 0.4 V. Or, for example, on supposition that a total of 10 groups, each of which is formed of five series-connected semiconductor lasers, are in series connected to one another, if a SCR is in parallel connected to each group, for example, what is necessary is just to configure a gate circuit so that threshold voltage may be 28 V, by expecting the margin voltage of 1.5 V.

Figure 2:
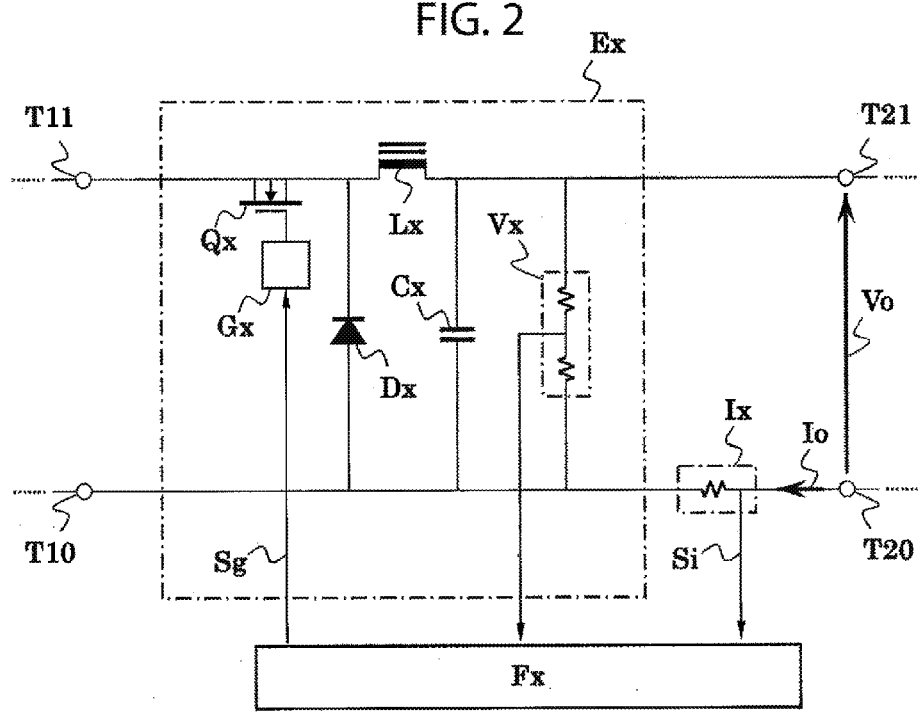
FIG. 2 is a schematic diagram showing an aspect of part of a light source apparatus according to an embodiment of the present invention.

FIG. 2 shows an embodiment of the converter circuit (Ex) which can be used in the present light source apparatus. The converter circuit (Ex) operates in response to supply of voltage from the DC power supply (Uv) connected to the nodes (T10, T11), and electric supply to the light emitting element series connection circuit (Ns) is adjusted. In the above-mentioned converter circuit (Ex), a switch element (Qx) such as an FET switches ON/OFF of current from the above-mentioned DC power supply (Uv). A smoothing capacitor (Cx) is charged through a choke coil (Lx), and this voltage is applied to the light emitting element series connection circuit (Ns) from the nodes (T20, T21), so that current can be passed through the light emitting element series connection circuit (Ns).

In addition, in a period during which the switch element (Qx) is in an ON state, while the smoothing capacitor (Cx) is directly charged by current which passes through the element (Qx) and the current is supplied to the light emitting element series connection circuit (Ns) which is a load, energy is stored in the choke coil (Lx) in form of magnetic flux. On the other hand, during an OFF state of the switch element (Qx), current is supplied to the light emitting element series connection circuit (Ns) by the energy in the form of magnetic flux, which is stored in the choke coil (Lx) through a flywheel diode (Dx), and the electric discharge from the smoothing capacitor (Cx). In such a step down chopper type converter circuit (Ex), the amount of electric power to be supplied to the light emitting element series connection circuit (Ns) can be adjusted based on a ratio of an period of the ON state of the switch element (Qx) to an operating cycle of the switch element (Qx), that is, a duty cycle ratio thereof. Here, a gate drive signal (Sg) which has a certain duty cycle ratio is generated by the electric supply control circuit (Fx), and an ON/OFF state of the current from the DC power supply (Uv) is controlled by controlling the gate terminal of the switch element (Qx) through the gate drive circuit (Gx).

The output current Io, which flows through the light emitting element series connection circuit (Ns), and the output voltage Vo, which is applied to the light emitting element series connection circuit (Ns), are detected by an output current detecting unit (Ix) and an output voltage detecting unit (Vx) respectively. On the other hand, it is possible to easily configure the output current detecting means (Ix) by using a shunt resistor, and the output voltage detecting unit (Vx) by using a voltage divider, respectively.

In case where the input of the DC power supply (Uv) is connected to a commercial power source (Ps) so as to supply electric power to a downstream side thereof and it has, for example, a non-insulated structure which is not insulated by a transformer, so that the output of the DC power supply (Uv) may not be electrically insulated from the commercial power source (Ps), since, as described above, a circuit on an input side of the converter circuit (Ex) and a circuit of an output side thereof are not electrically insulated from each other, the emitting element series connection circuit (Ns) to which electric power is supplied from the converter circuit (Ex) is not electrically isolated from the commercial power source (Ps).

As described above, even in such case, since each of solid light emitting elements (Dy1, Dy2, . . . ), is fixed to a heat sink (Hs) so that required thermal contact may be realized in a state where electric insulation is made mutually, as described above, even when the heat sink (Hs) is made from conducting material such as metal, the heat sink (Hs) does not become a hazardous voltage charging part. Therefore, when the electric insulation made for the solid light emitting element (Dy1, Dy2, . . . ) has the dielectric strength, which is required by the safety standard, even if a casing of the main body apparatus such as a projector in which the light source apparatus is installed, has conductive property, it also becomes possible to directly connect the heat sink (Hs) thereto.

According to the present light source apparatus, problems of safety are not caused, and since an output of the DC power supply (Uv), which is connected to a commercial power source (Ps), may receive electric supply from what is configured by elements which are not insulated from the commercial power source (Ps), it is possible to contribute to low cost of the main body apparatus such as a projector in which this light source apparatus is installed. In general, in a projector etc., a cheap power factor improvement active filter type DC power supply, which is based on a boost chopper, is frequently used as a DC power supply whose input and output terminals are connected to such a non-insulated commercial power source (Ps), and as a matter of course, this light source apparatus can receive electric supply from this type of DC power supply.

In the interface circuit (Tx), for example, it is realizable that the analog quantity electrically insulated from the modulation amount specifying signal (Sm) is generated, by using the same technology as that used for digital data transmitted through an optical fiber. For example, first of all, after the modulation amount specifying signal (Sm), which is parallel digital data having a certain bit length, is changed into a serial electrical signal using a parallel-serial conversion circuit, it is changed into light signal modulated with this serial electrical signal by a modulation circuit and light emitting elements. Next, after this light signal is demodulated and changed into a serial electrical signal by a light receiving element(s) which is electrically insulated from the modulation circuit, and a demodulating circuit, and the parallel digital data having the same bit length is demodulated by using a serial-parallel-conversion circuit so that an electrical signal, which is electrically insulated from the modulation amount specifying signal (Sm) and which has the same form and the same content, is generated, the analog quantity can be realized by a data insulation transmission unit (At) which changes it into an analog signal by a D/A converter.

Or when the modulation amount specifying signal (Sm) is digital data, it can be also realized by a data insulation transmission unit (At), which is an analog quantity transmission type, wherein first, it is changed into analog quantity, which is correlated with the content of data, and then after this changed analog quantity is changed into another signal which is insulated electrically therefrom, a target analog signal is acquired.

For example, when the modulation amount specifying signal (Sm) is parallel digital data which has bit length, the intended analog signal can be acquired by a level signal converting type and analog quantity transmission type data insulation transmission unit (At), in which the digital data is changed into a serial signal which has pulse width correlated with the content of data (the so-called PWM), and then after the serial signal is changed into an electrically insulated serial signal by using a photocoupler, a pulse component is removed by using a low pass filter. Moreover, instead of such pulse width modulation, the same can be achieved by an analog quantity transmission type data insulation transmission unit (At) in which data is changed into a serial signal which has pulse frequency or frequency correlated with the content of the data (the so-called FM). Furthermore, instead of using the above-mentioned photocoupler, a magnetic coupling type device, which transmits a signal to a secondary side through an insulated transformer and demodulates it, may be used.

Figure 3:
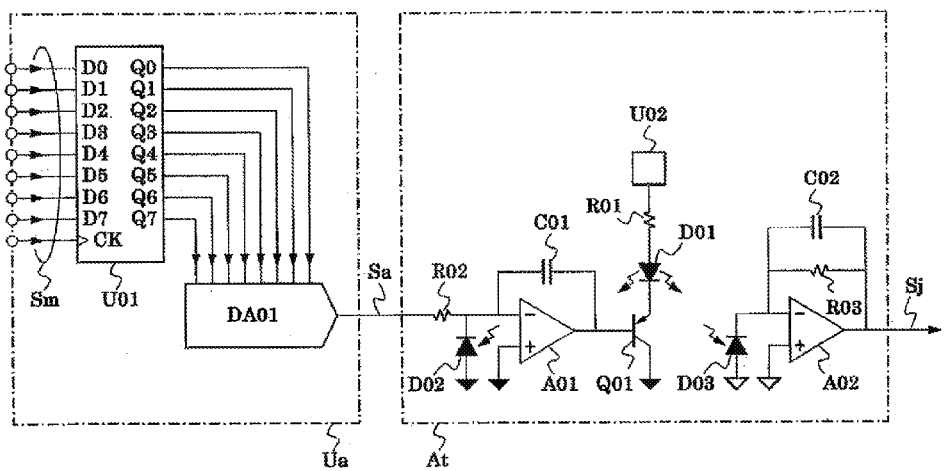
FIG. 3 is a schematic diagram showing an aspect of part of a light source apparatus according to an embodiment of the present invention.

Moreover, for example, in a similar manner, in case where the modulation amount specifying signal (Sm) is parallel digital data having bit length, the intended analog signal can be acquired by an analog quantity transmission typed data insulation transmission unit (At), which changes the parallel digital data into an analog signal by using a D/A converter so as to have the size correlated with the content of data, and transmits analog quantity in a state where this analog signal is insulated electrically. FIG. 3 shows an embodiment of the interface circuit (Tx), which can be used in the present light source apparatus, and which is based on the above and last described type.

The modulation amount specifying signal (Sm), which is received by the host circuit (Uh) is inputted into a register (U01) provided in a signal transformation circuit (Ua). Here, the modulation amount specifying signal (Sm) comprises a digital modulation data signal (D0-D7) having 8 bit length, and a modulation data latch signal (CK), wherein it is assumed that the modulation data latch signal (CK) transits from a low level to a high level at time of data determination. If the register (U01) receives a modulation data latch signal (CK) which transits from a low level to a high level, each bit value of the modulation data signal (D0-D7) is held, and is inputted into a D/A converter (DA01) as a latch modulation data signal (Q0-Q7), wherein this D/A converter (DA01) outputs a modulation amount correlation signal (Sa), which corresponds to a value expressed with the latch modulation data signal (Q0-Q7), and is proportional to the modulation amount specifying signal (Sm).

The modulation amount correlation signal (Sa) is inputted into the analog quantity transmission typed data insulation transmission unit (At), which uses a photocoupler (for example, HCNR201 manufactured by Avago Technologies) for transmitting analog quantity in a state where it is electrically insulated. An LED (D01) of the data insulation transmission unit (At), which is the above-mentioned analog quantity transmission type, is driven by current, which flows through a resistor (R01) from a DC power supply (U02) having suitable voltage, into an emitter terminal of a transistor (Q01), and a base terminal of the transistor (Q01), which forms an emitter follower circuit, is driven by an output signal of an operational amplifier (A01).

The modulation amount correlation signal (Sa) is inputted into an inverting input terminal of the operational amplifier (A01) through a resistor (R02). Similarly, a current signal from a photo-diode (D02) which is optically coupled with the LED (D01), is inputted into the inverting input terminal of the operational amplifier (A01), and furthermore, an output signal of the operational amplifier (A01) is also fed back through an integrating capacitor (C01), whereby the operational amplifier (A01) functions as an error integration circuit which, in a feedback manner, controls the current which flows through the LED (D01), so that the difference between the current signal from the photo-diode (D02) and the modulation amount correlation signal (Sa) may become small.

On the other hand, a current signal from a photo-diode (D03), which is optically coupled with the LED (D01), is inputted into an inverting input terminal of an operational amplifier (A02) which is electrically insulated from the operational amplifier (A01) and a circuit connected thereto, and furthermore, the output signal of the operational amplifier (A02) is also fed back through a resistor (R03) and a phase compensation capacitor (C02) for response speed limit connected in parallel therewith, whereby the operational amplifier (A02) outputs a voltage signal proportional to the current signal from the photo-diode (D03). Since the photo-diode (D02) and the photo-diode (D03) are optically coupled with the same LED (D01) and are driven simultaneously, the size of the current signal, which is outputted from the photo-diode (D02) and the photo-diode (D03), is proportional to the size of the modulation amount correlation signal (Sa), whereby the operational amplifier (A02) generates the intended analog current signal (Sj) as the voltage signal proportional to the size of the modulation amount specifying signal (Sm), in a state where it is electrically insulated from the modulation amount specifying signal (Sm).

In addition to such a photocoupler insulation type, as the analog quantity transmission type data insulation transmission unit (At), for example, a magnetic coupling type may be used in which it is AM-modulated at high frequency, and transmitted to a secondary side thereof through an insulated transformer so as to be demodulated.

Figure 4A:
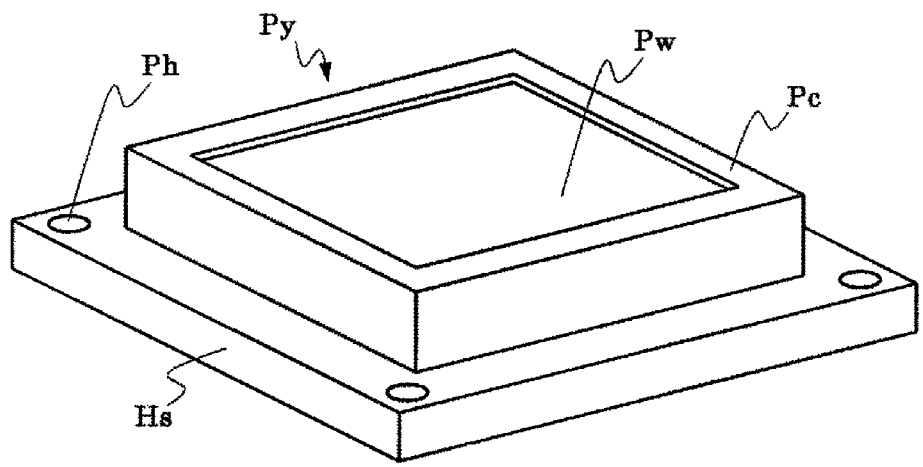
FIGS. 4A and 4B are schematic diagrams showing an aspect of part of a light source apparatus according an embodiment of to the present invention.
Figure 4B:
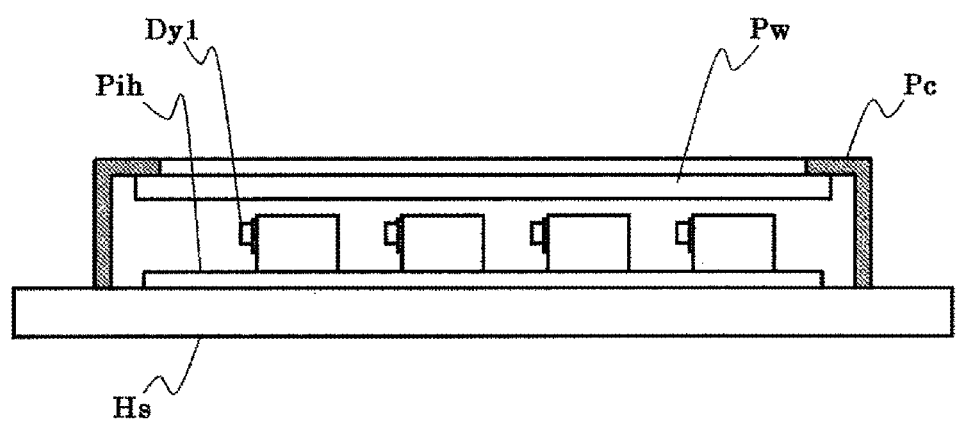

Next, an embodiment of the present invention will be described, referring to FIGS. 4A and 4B which are schematical and conceptual diagrams showing part of an example of the present light source apparatus. FIG. 4A is an external view of a package in which solid light emitting elements (Dy1, Dy2, . . . ) are provided, and FIG. 4B shows an internal structure of the package. A heat sink (Hs) is made from material such as metal etc. whose thermal conductivity is good, and forms a bottom of the package (Py), wherein the heat sink (Hs) may be fixed to a still larger heat sink through holes (Ph) for fixation, thereby integrally functioning as a heat sink. A window (Pw) for taking out bundles of rays emitted from the solid light emitting element (Dy1, Dy2, . . . ) is provided in a cover (Pc), which is made from, for example, metal, ceramics, etc., and which is joined to the heat sink (Hs), thereby forming a hermetic seal structure.

Inside of the cover (Pc), for example, an insulation material base plate (Pih) made of aluminium nitride etc., whose thermal conductivity is good, is fixed on the heat sink (Hs) by means of, for example, adhesive joining. The solid light emitting elements (Dy1, Dy2, . . . ) are fixed to this insulation material base plate (Pih), directly or through a structural component by means of, for example, adhesive joining. In addition, in order to prevent deterioration of the solid light emitting element (Dy1, Dy2, . . . ) etc., gas such as inert gases is enclosed in the space inside the cover (Pc). In addition, the light source apparatus of an embodiment of the present invention may be made up of a plurality of packages (Py). Description of an example of a structure which is fixed to the insulation material base plate (Pih) will be given below, referring to FIGS. 5-7, which are conceptual and schematic diagrams of an example of part of the light source apparatus according to the embodiment of the present invention.

In FIG. 5, solid light emitting elements (Dy1, Dy2, . . . ) are fixed to a mount stand (Pmd) which is made up of material such as metal whose thermal conductivity is good, thereby forming a light emitting element module (Pu1), wherein two or more light emitting element modules (Pu1, Pu2, . . . ) are fixed to, for example, an insulation material base plate (Pih) made of aluminium nitride etc. whose thermal conductivity is good. However, a mount insulation material layer (Pim) is respectively provided between the solid light emitting elements (Dy1, Dy2, . . . ) and the mount stands (Pmd), whereby insulation between the respective solid light emitting elements (Dy1, Dy2, . . . ) is secured. Therefore, insulation between the respective light emitting element modules (Pu1, Pu2, . . . ) and insulation between the light emitting element modules (Pu1, Pu2, . . . ) and the heat sink (Hs) is secured by the insulation material base plate (Pih). In addition, dielectric strength required for the mount insulation material layer (Pim), is obtained by adding a margin to maximum voltage which may be generated in a series connection part of all the solid light emitting elements (Dy1, Dy2, . . . ) mounted in one mount stand (Pmd), when current required for the light emitting element series connection circuit (Ns) is passed therethrough.

When each of the solid light emitting elements (Dy1, Dy2, . . . ) is a semiconductor laser, a back face of the semiconductor base plate is fixed to the mount insulation material layer (Pim), so that an end face thereof, in which a light emitting area of the semiconductor base plate is formed, faces upwards in the figure. Therefore, although the central ray (Lp) from each light emitting area is perpendicular to the insulation material base plate (Pih), a bundle of rays has a divergence angle under the influence of diffraction phenomena. Although the divergence angle of the marginal rays (Lmx1, Lmx2) in the width direction of the semiconductor laser active layer is small, since the thickness of an active layer is small, the divergence angle of the marginal rays (Lmy1, Lmy2) in the thickness direction becomes large, so that a bottom face of a radiation pattern (Ci), that is, a cone, which represents an emission angle region, becomes, in shape, an ellipse which is long in a direction where the light emitting element modules (Pu1, Pu2, . . . ) are aligned.

In FIG. 6, a mount insulation material layer (Pim) is formed on an upper face of the mount stand (Pmd) (parallel to an insulation material base plate (Pih)), since a back face of a semiconductor base plate of each solid light emitting element (Dy1, Dy2, . . . ) is fixed to this face, a central ray (Lp) from a light emitting area of each solid light emitting element (Dy1, Dy2, . . . ) is emitted in parallel to the insulation material base plate (Pih). Since mirrors (Ma1, Ma2, . . . ) are fixed to the insulation material base plate (Pih) together with the light emitting element module (Pu1, Pu2, . . . ), the central rays (Lp) is reflected, so that the central rays (Lp') may be directed perpendicular to the insulation material base plate (Pih).

Figure 7:
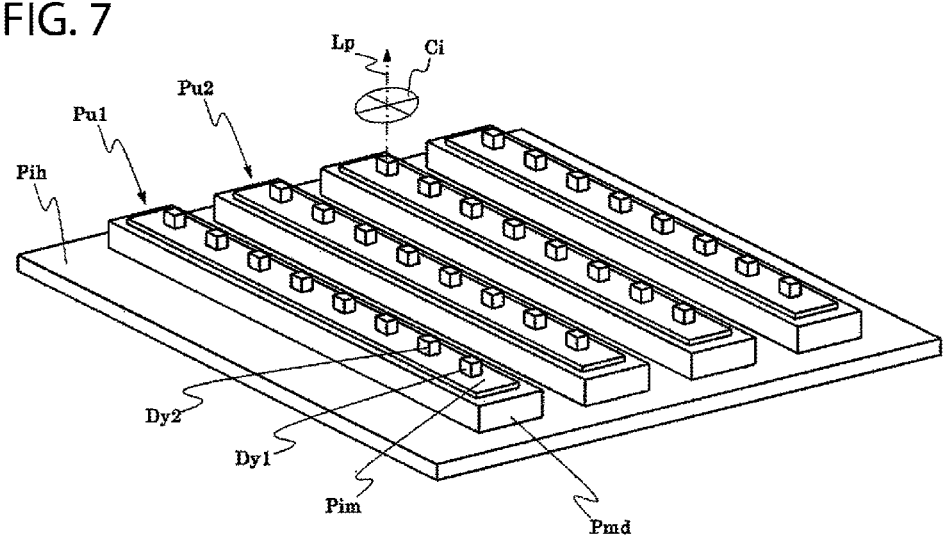
FIG. 7 is a schematic diagram showing an aspect of part of a light source apparatus according to an embodiment of the present invention.

Although similarly to FIG. 6, in FIG. 7, a mount insulation material layer (Pim) is formed on an upper face of a mount stand (Pmd) and a back face of a semiconductor base plate of each solid light emitting element (Dy1, Dy2, . . . ) is fixed to this face, when each of the solid light emitting elements (Dy1, Dy2, . . . ) is a face emission type semiconductor laser, a surface thereof, in which a light emitting area of the semiconductor base plate is formed, face upwards in the figure. Therefore, the central ray (Lp) from the light emitting area of each solid light emitting element (Dy1, Dy2, . . . ) is emitted at right angle to an insulation material base plate (Pih). In this case, a bottom face of a radiation pattern (Ci), that is, a cone which represents an emission angle region, becomes a round shape approximately.

If it is seen from the outside of the above-mentioned window (Pw) of the above-mentioned package (Py), it can be considered that a light emitting area (Ky1, Ky2, . . . ) of each solid light emitting element (Dy1, Dy2, . . . ) is regarded as a cluster of point images aligned independently in all directions on the same plane. And as described above, since the divergence angle of the emission angle region from each point image is comparatively large, a condition for the embodiment of the present invention, where one geometrical-optical output image and an light emitting area of each of all the solid light emitting elements are conjugate with each other, cannot be realized by one coaxial lens system.

Figure 8:
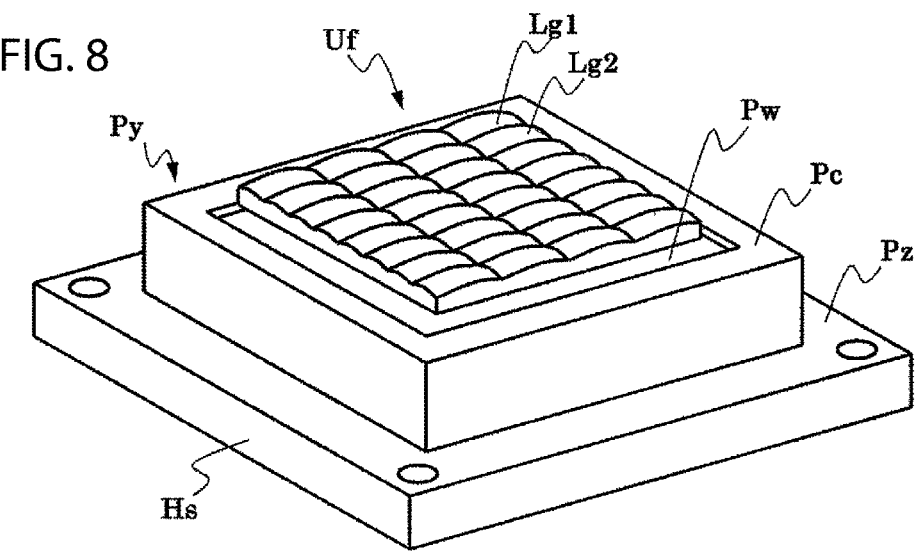
FIG. 8 is a schematic diagram showing an aspect of part of a light source apparatus according to an embodiment of the present invention.

As shown in FIG. 8, which is a schematic and conceptual diagram of an example of part of the light source apparatus according to the embodiment of the present invention, in order to avoid this problem, a beam flux conversion optical system (Uf) is configured by aligning lenses (Lg1, Lg2, . . . ) which respectively correspond to point images of spots of this cluster and which are independent of one another, thereby forming one geometrical-optical output image (Kf) from each point image. In addition, if a position at which the beam flux conversion optical system (Uf) is provided is too far from the package (Py), beams (bundles of rays) emitted from the solid light emitting elements (Dy1, Dy2, . . . ) will overlap each other, since light from the two or more solid light emitting elements enters one lens (Lg1, Lg2, . . . ) so that the intended image cannot be formed. Thus, it is necessary to design the structure so as to bring the beam flux conversion optical system (Uf) close to the package (Py), so that the beams may not overlap each other.

Moreover, in case of a semiconductor laser which has an active layer in an end face, unless an interval of the solid light emitting elements in a direction, where a divergence angle is larger, is sufficiently set, even if the beam flux conversion optical system (Uf) is brought close to the package (Py), the problem occurs in which beams emitted from the solid light emitting elements overlap each other. For example, in the case shown in FIG. 5, it is suitable to set up an interval of the light emitting element modules (Pu1, Pu2, . . . ) larger than that of the solid light emitting elements (Dy1, Dy2, . . . ) on the light emitting element module, to the extent that such a problem does not occur.

As to the lens of the beam flux conversion optical system (Uf), if, for example, an upper face of the heat sink (Hs) of the package (Py) is regarded as a normae (Pz), and the infinity in a direction perpendicular to this normae is set as an output image (Kf), what is necessary is just to make the lenses (Lg1, Lg2, . . . ) function as collimating lenses, wherein the optic axis of each lens (Lg1, Lg2, . . . ) passes through the position of the light emitting area (Ky1, Ky2, . . . ) of each corresponding solid light emitting element (Dy1, Dy2, . . . ), and is arranged perpendicular to the normae (Pz).

In addition, it is suitable to mold a device shown in FIG. 8, in which lenses (Lg1, Lg2, . . . ) are aligned in a matrix, as an integrated unit by technology similar to the manufacturing technology of an fly eye lens. At this time, the package (Py) may be configured so that the beam flux conversion optical system (Uf), which is integrally formed by arranging the lenses (Lg1, Lg2, . . . ) in a matrix, may also serve as a window (Pw).

Although not illustrated, when for example, electrical connection to the solid light emitting elements (Dy1, Dy2, . . . ) is realized inside the package (Py) shown in FIG. 4, it is possible to use the technology such as die bonding and wirebonding, which is the conventional technology of mounting and packaging of a semiconductor device. Moreover, when electrical connection for the electric supply from the outside of the package (Py) to the inside thereof is realized, similarly, it is possible to use the technology such as feed-through which is the conventional technology of the packaging and the hermetic seal of a semiconductor chip.

Moreover, for example, it is possible to give sufficient dielectric strength to the insulation material base plate (Pih), to the extent that the package (Py) shown in FIG. 4 may be directly connected to the conductive casing of the main body apparatus such as a projector in which this light source apparatus is installed. However, for example, similarly to those shown in FIGS. 9A, 9B, 9C and 10 which are described later, on the condition that an insulating member, which has sufficient dielectric strength, is made to intervene therebetween outside the package, i.e., an external enclosure, and the package is fixed to the conductive casing of the main body apparatus such as a heat sink and a projector, it is also possible to configure the structure so that the dielectric strength given to the insulation material base plate (Pih) may be controlled to the extent that each of the solid light emitting elements (Dy1, Dy2, . . . ), which is contained in the package (Py), can be in series connected thereto.

Figure 9A:
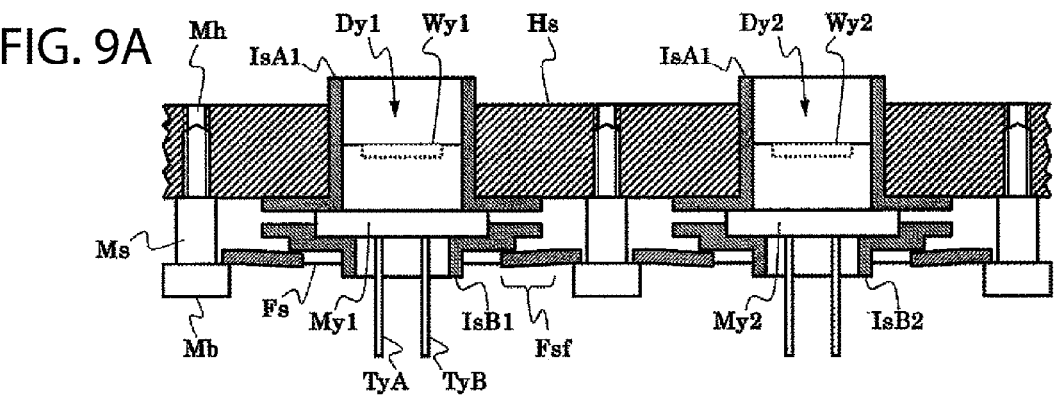
FIGS. 9A, 9B and 9C is a schematic diagram showing an aspect of part of a light source apparatus according to an embodiment of the present invention.
Figure 9B:
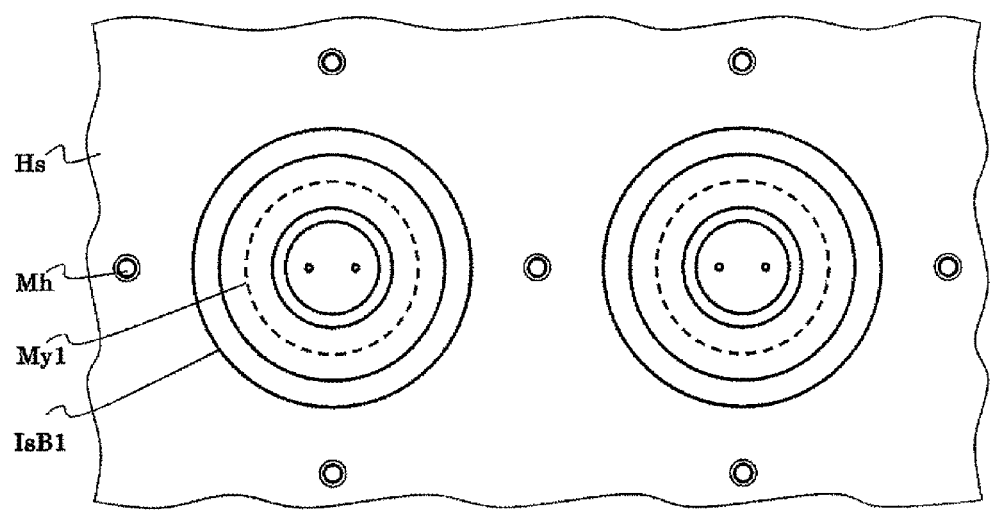
Figure 9C:
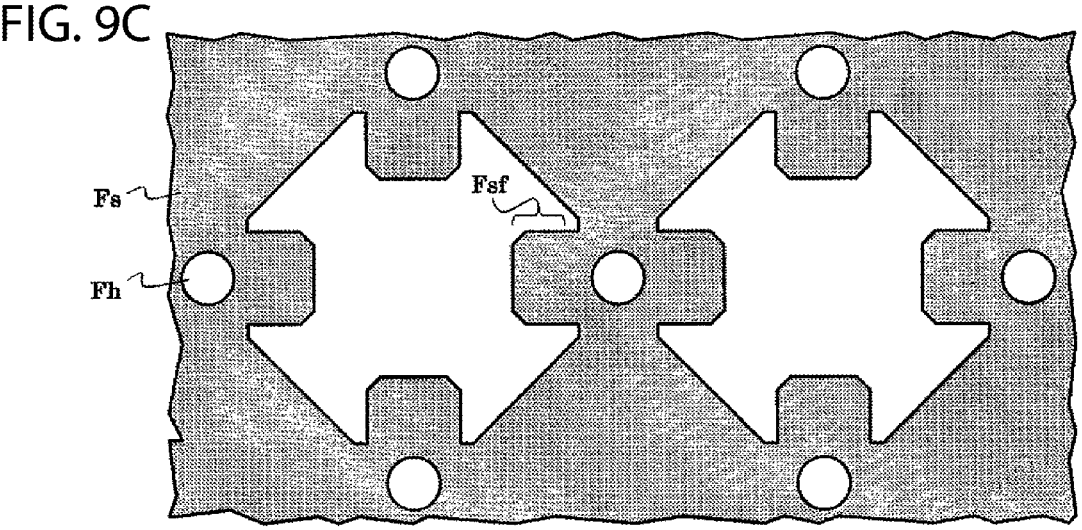

Next, an embodiment of the present invention will be described, referring to FIGS. 9A and 9B which are schematical and conceptual diagrams showing part of an example of the present light source apparatus. FIG. 9A is a cross sectional view of a heat sink (Hs) to which the solid light emitting elements (Dy1, Dy2, . . . ) are fixed. FIG. 9B is an external view thereof, which is viewed from an opposite side to a side from which light of the heat sink (Hs) is emitted, showing a state before a fixing member (Fs), which is described below, is attached thereto. FIG. 9C shows the shape of the fixing member (Fs) which is part of the whole thereof (only two solid light emitting elements (Dy1, Dy2, . . . )).

Each solid light emitting element (Dy1, Dy2, . . . ) which forms a light emitting element series connection circuit (Ns), has a structure generally called a can type, which is covered with an external enclosure made up of a metal casing portion (My1, My2, . . . ) and a light transmission window portion (Wy1, Wy2, . . . ). Insulating members (IsA1, IsA2, . . . ) are provided on a side of the metal casing portion (My1, My2, . . . ) from which light is emitted, and insulating members (IsB1, IsB2, . . . ) are provided on an opposite side to the side from which light is emitted. The solid light emitting elements (Dy1, Dy2, . . . ) are fixed to the heat sink (Hs) by sandwiching these members by the heat sink (Hs) and the fixing member (Fs).

The fixing member (Fs) is formed by punching out plate material such as phosphor bronze, which is made of metal and which has elasticity, so as to form the shape shown in FIG. 9C, wherein projecting portions (Fsf) are formed so as to be brought into contact with the insulating member (IsB1, IsB2, . . . ). Therefore, screws (Mb) are passed, through respective penetration holes (Fh) of the fixing member (Fs), into respective screw holes (Mh) of the heat sink (Hs), and they are screwed up through spacers (Ms), wherein since the projecting portions (Fsf) are elastically deformed, the solid light emitting elements (Dy1, Dy2, . . . ) are respectively pressed against the heat sink (Hs) by the pressure according to this deformation. Required fixing strength can be given by suitably setting up the thickness of the material of the fixing member (Fs), and the amount of deformation to be given thereto, i.e., the length of the spacer (Ms).

The insulating members (IsA1, IsA2, . . . ), which intervene between the heat sink (Hs) and the metal casing portion (My1, My2, . . . ), need to be made from material such as ceramics whose thermal conductivity is good. It is necessary to provide current-carrying terminals (TyA, TyB) of each solid light emitting element (Dy1, Dy2, . . . ) with electric supply wiring and connect in series to each other. To that end, it is suitable to use a flexible printed wiring board in which a copper foil pattern is formed on a surface of film-like base material such as polyimide. If as few excessive big holes as possible other than the holes for current-carrying terminals (TyA, TyB) are formed in this flexible printed wiring board, since a closed space is formed between this flexible printed wiring board and the heat sink (Hs), it is possible to use this space as a duct for passing a cooling air, whereby the cooling efficiency of the heat sink (Hs) can be improved.

In addition, with respect to the shape of the insulating member (IsA1, IsA2, . . . ) and that of the insulating member (IsB1, IsB2, . . . ), although the length of a cylindrical part and the diameter of a flange-like part may seem to be large more than needed. This is because, as described above, it is necessary to secure a creepage distance in order to secure the dielectric strength between the light emitting element series connection circuit (Ns), which is insulated from a commercial power source (Ps), the metal casing portion (My1, My2, . . . ) or the current-carrying terminals (TyA, TyB), and the heat sink which may be connected to the casing of the main body apparatus such as a projector.

In addition, although the heat sink (Hs) is arranged on a side from which the light of the solid light emitting elements (Dy1, Dy2, . . . ) is emitted, the heat sink (Hs) may be arranged on a side opposite to the side from which light is emitted. The detail of the structure thereof is shown in FIG. 10. In this figure, components shown in FIG. 10 are given the same reference signs given to the same components shown in FIG. 9, respectively and function similarly to the components shown in FIG. 9. The description about those components with respect to FIG. 9, can be applied hereto.

Next, description of an embodiment according to the present invention will be given referring to FIGS. 11A and 11B, which are schematic and conceptual diagrams showing an example of part of the light source apparatus of the embodiment of the present invention. FIG. 11A shows an assembly structure for attaching a collimating lens to a solid light emitting element. FIG. 11B shows a state where lens holders (Hz1, Hz2, . . . ) to which collimating lenses (Lz1, Lz2, . . . ) are respectively fixed are installed in respective solid light emitting elements (Dy1, Dy2, . . . ). Both figures show part of the whole (only one or two solid light emitting elements (Dy1, Dy2, . . . )).

In the figures, similarly to that shown in FIGS. 9A-9C, a collimating lens (Lz1, Lz2, . . . ) is attached to each of a can type solid light emitting element (Dy1, Dy2, . . . ) which is the same type as that shown in FIGS. 9A-9C, so that a beam flux conversion optical system (Uf) is configured by all the collimating lenses (Lz1, Lz2, . . . ). In order to install the collimating lens (Lz1, Lz2, . . . ) so that parallel light is emitted in a direction perpendicular to a normae (Pz1, Pz2, . . . ) of a structure of the metal casing portions (My1, My2, . . . ) of the solid light emitting elements (Dy1, Dy2, . . . ), for example, a collimating lens (Lz1, Lz2, . . . ) is first fixed to each lens mount (Hz1', Hz2', . . . ) by means of, for example, adhesion etc., and then, the lens mount (Hz1', Hz2', . . . ) is fixed to the lens holder (Hz1, Hz2, . . . ), to which the solid light emitting element (Dy1, Dy2, . . . ) is fixed by means of, for example, adhesion etc., whereby the collimating lens (Lz1, Lz2, . . . ) is fixed to the lens holder (Hz1, Hz2, . . . ). That is, when the collimating lens (Lz1, Lz2, . . . ) is fixed to the lens holder (Hz1, Hz2, . . . ), the lens mount (Hz1', Hz2', . . . ) is made to intervene therebetween, without directly fixing them to each other.

According to the above-described configuration, if the collimating lens (Lz1, Lz2, . . . ) is fixed to the lens mount (Hz1', Hz2', . . . ) so as not be eccentric, light is emitted to the lens holder (Hz1, Hz2, . . . ) which is fixed to the solid light emitting element (Dy1, Dy2, . . . ) by passing current through the solid light emitting element (Dy1, Dy2, . . . ), and then the position thereof in an optic axis direction (and position within a face perpendicular thereto) is narrowed down into a predetermined position while performing an optical observation so that the light which passes through the collimating lens (Lz1, Lz2, . . . ) may correctly turn into parallel light, whereby the lens mount (Hz1', Hz2', . . . ) can be fixed to the lens holder (Hz1, Hz2, . . . ). In addition, although FIG. 11B shows an adhesives potting (HpA) for fixing the collimating lens (Lz1, Lz2, . . . ), and an adhesives potting (HpB) for fixing the lens mount (Hz1', Hz2', . . . ), it is not necessary to apply them to all the circumferences of the collimating lens (Lz1, Lz2, . . . ) or the lens mount (Hz1', Hz2', . . . ), and they may be applied to a couple of places of the circumference.

Moreover, as easily understood from comparison with FIGS. 9A-9C, in FIG. 11B, the lens holders (Hz1, Hz2, . . . ) serve as the insulating members (IsA1, IsA2, . . . ). Thus, by configuring the structure so that the lens holders serve as the insulating member, it is possible to reduce the number of parts and reduce the cost thereof.

FIGS. 12A and 12B are schematic and conceptual diagrams showing an example of part of a light source apparatus according to an embodiment of the present invention, which is similar to that shown in FIGS. 11A and 11B. Description of an embodiment according to the present invention will be given below referring to FIGS. 12A and 12B. FIG. 12A shows an assembly structure for attaching a solid light emitting element to a collimating lens. FIG. 12B shows a state where a lens holder to which a collimating lens is fixed is installed in a solid light emitting element. Both figures show part of the whole thereof (only one or two solid light emitting elements (Dy1, Dy2, . . . )).

The embodiment shown in FIGS. 12A and 12B is different from that shown in FIGS. 11A and 11B, in that a collimating lens (Lz1) is fixed to a lens holder (Hz1) by means of, for example, adhesion etc., and this lens holder (Hz1) is fixed to a metal casing portion (My1) of a solid light emitting element by means of, for example, adhesion etc. According to the above-described configuration, the solid light emitting element (Dy1) emits light by passing current therethrough and then the position thereof in an optic axis direction and the position within a face perpendicular thereto are narrowed down into a predetermined position while performing an optical observation so that the light which passes through the collimating lens (Lz1) may correctly turn into parallel light, which is perpendicular to the normae (Pz1), whereby the lens holder (Hz1) can be fixed to the metal casing portion (My1).

In addition, although FIG. 12B shows an adhesives potting (HpC) for fixing the collimating lens (Lz1) to the lens holder (Hz1), and an adhesives potting (HpD) for fixing the lens holder (Hz1) to the metal casing portion (My1), it is not necessary to apply them to all the circumferences thereof, and they may be applied to a couple of places of the circumference, similarly to the description of FIG. 11B. In addition, the embodiment shown in FIG. 12B is different from that shown in FIG. 11B, in that the lens holder (Hz1) serves as an insulating member between the heat sink (Hs) and the metal casing portion (My1).

Figure 13A:
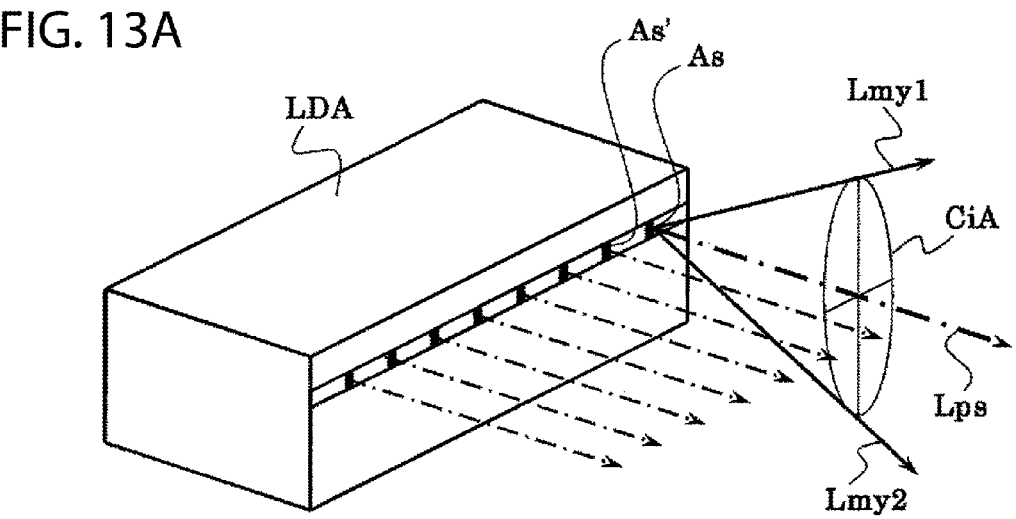
FIGS. 13A and 13B are schematic diagrams showing an aspect of part of a light source apparatus according to an embodiment of the present invention.
Figure 13B:
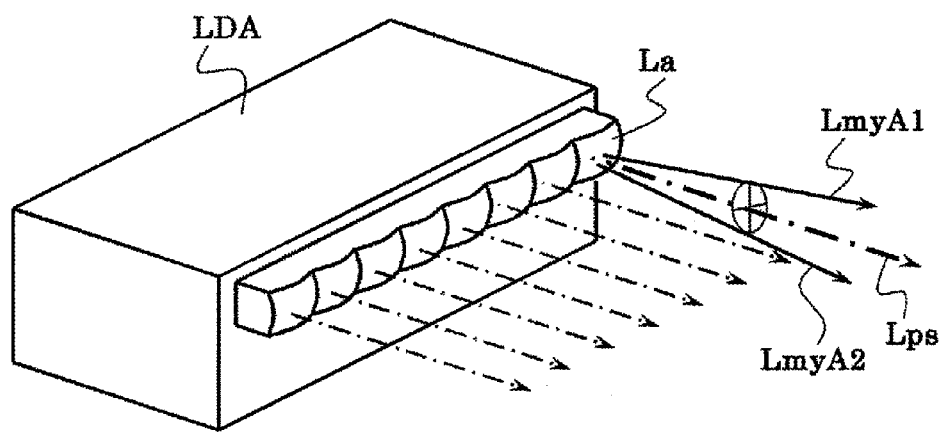

Also, semiconductor laser array devices (LDA) shown in FIGS. 13A and 13B (which are conceptual diagrams), may be employed as solid light emitting elements (Dy1, Dy2, . . . ) of the light source apparatus according to the embodiments of the present invention, in addition to a discrete type solid light emitting element which is in a chip shape shown in FIGS. 5, 6, and 7. Semiconductor laser active layers (As, As', . . . ) are aligned at an end face of this semiconductor laser array device (LDA), and diverging light is emitted from each semiconductor laser active layers (As, As', . . . ). In the case of an end face emission type semiconductor laser regardless of type thereof such as a discrete type and an array type, the divergence angle of marginal rays (Lmy1, Lmy2) about a direction perpendicular to a semiconductor base plate face, namely, a thickness direction of an active layer is especially large due to an influence of diffraction phenomena, so that a bottom face of a radiation pattern (CiA), that is, a cone which represents an emission angle region, becomes a very ellipse instead of a circle.

Similarly to that described with respect to FIG. 8, in this case, although it can be considered that lenses which are the same as the above-described lenses (Lg1, Lg2, . . . ) may be aligned and arranged by corresponding them to the row of the above-mentioned semiconductor laser active layers (As, As', . . . ), since for example, compared with an interval of the aligned discrete type solid light emitting elements (Dy1, Dy2, . . . ) shown in FIG. 5, an interval of the above-mentioned aligned array type semiconductor laser active layers (As, As', . . . ) is very small (for example, 1/100 that of the discrete type), lenses having a focal distance very shorter than the lenses (Lg1, Lg2, . . . ) must be arranged so as to be brought extremely close to the semiconductor laser array device (LDA) in order that bundles of rays from the semiconductor laser active layers (As, As', . . . ) do not overlap.

In view of such a situation, as show in FIG. 13B, which is a conceptual view, it is possible to use an emission angle correction lens array (La) which performs collimation individually to each bundle of rays from the semiconductor laser active layers (As, As', . . . ). In the emission angle correction lays array (La), lenses can be closely arranged. When a focal distance is long as in the case of the solid light emitting elements (Dy1, Dy2, . . . ) and they are separated from the light emitting area, there is no problem since the active layers which are the light emitting areas (Ky1, Ky2, . . . ) are regarded as a point image. However, when a focal distance is short as in the case of the emission angle correction lens array (La) and they are close to a light emitting area, it becomes impossible to ignore a large astigmatic component contained in the bundles of rays emitted from the light emitting area, due to the semiconductor laser active layers (As, As', . . . ) whose shape is flat. Therefore, a refractive surface of each emission angle correction lens array (La) is not molded as a spherical surface, but molded as, for example, a toric face, in which a curvature radius differs in a direction parallel to a direction perpendicular to a base plate face.

In this way, as in the marginal rays (LmyA1, LmyA2), while the divergence angle in a direction parallel to a base plate face is reduced, the divergence angle in a direction perpendicular to a base plate face is reduced more than that, so that ideally, the divergence angles in both directions parallel and perpendicular to the base plate face are turned into a comparable level. This is because although in a geometrical-optically ideal situation, parallel light should be formed in both parallel and perpendicular directions to the base plate face, since a bundle of rays becomes thin after passing through the emission angle correction lens array (La), it will have a certain amount of divergence angle by the above-mentioned diffraction phenomena.

In addition, instead of realizing a toric face, if a cylindrical lens, which has a curvature in the direction perpendicular to a base plate face, and is common among the above-mentioned semiconductor laser active layers (As, As', . . . ), and individual cylindrical lenses, each of which has a curvature in the direction parallel to a base plate face, and is prepared for each of the above-mentioned semiconductor laser active layers (As, As', . . . ), are prepared and combined with each other, the same function as the above-mentioned emission angle correction lens array (La) can be realized.

Figure 14:
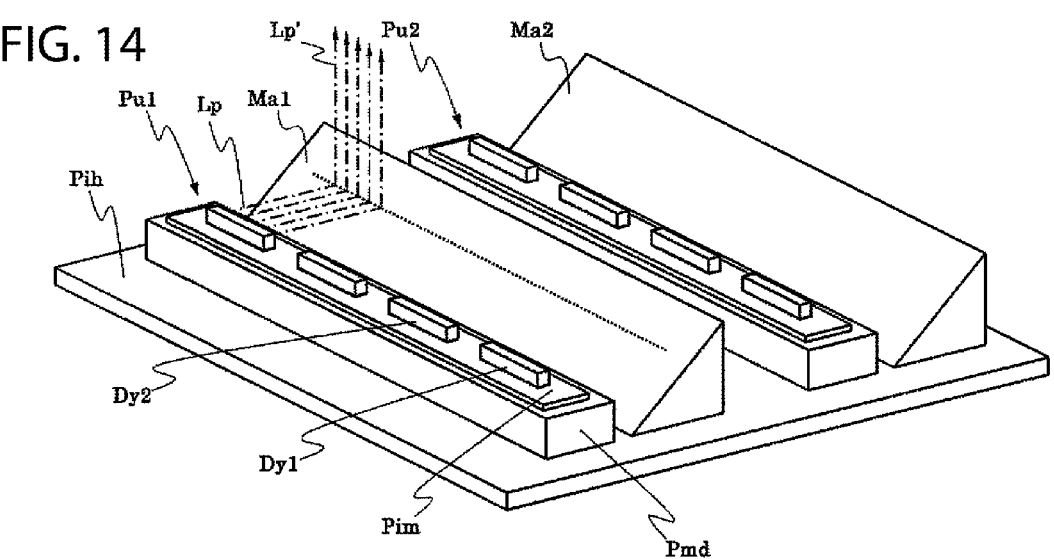
FIG. 14 is a schematic diagram showing an aspect of part of a light source apparatus according to an embodiment of the present invention.

FIG. 14 is a schematic and conceptual diagram of an example of part of the light source apparatus of an embodiment of the present invention. Similarly to FIG. 6, FIG. 14 shows a structure in which light emitting element modules (Pu1, Pu2, . . . ) and mirrors (Ma1, Ma2, . . . ) are fixed to an insulation material base plate (Pih), wherein the semiconductor laser array device (LDA) shown in FIG. 13B, which has the emission angle correction lens array (La), is fixed to a mount stand (Pmd), through a mount insulation material layer (Pim), as a solid light emitting element (Dy1, Dy2, . . . ) (or as a complex structure of the solid light emitting element (Dy1, Dy2, . . . ) and a beam flux conversion optical system (Uf)).

A light emitting element aggregate (Ud) can be configured by installing this structure in the package (Py) shown in FIG. 4. Since the central ray (Lps) from each semiconductor laser activity layer (As, As', . . . ) is parallel to each other, a telecentric optical system is formed. As described above, since the emission angle of a bundle of rays surrounding each central ray (Lps) is small due to an action of the emission angle correction lens array (La), if a convex lens is put on a downstream side of this light emitting element aggregate (Ud), a small exit pupil is formed on that focal plane so that this exit pupil can be treated as the above-mentioned output image (Kf).

Figure 15:
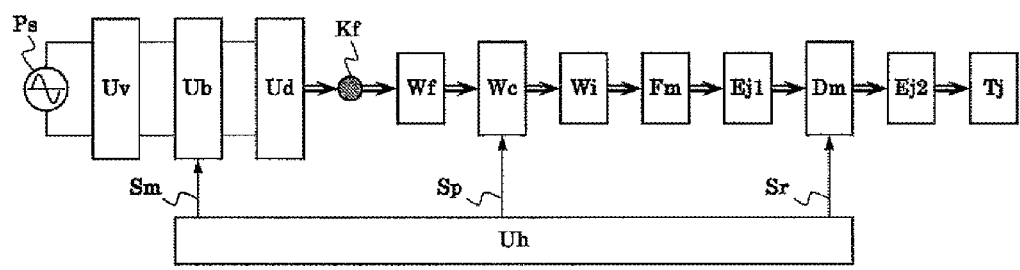
FIG. 15 is a schematic block diagram showing an aspect of a projector according to an embodiment of the present invention.

Description of an embodiment of the present invention will be given referring to FIG. 15, which is a schematic block diagram of a projector according to the embodiment of the present invention. A DC power supply (Uv) connected to the commercial power source (Ps) is formed by a power factor improvement active filter whose input and output are not insulated, wherein the power factor improvement active filter is, for example, based on a boost chopper. An electric supply circuit (Ub) receives an electric power supply from the DC power supply (Uv), and supplies current to the light emitting element series connection circuit (Ns) in the light emitting element aggregate (Ud). In order to realize delicate adjustment etc. of the balance of each color for the above-described matter, the electric supply circuit (Ub) carries out feedback control of the current supplied to the light emitting element series connection circuit (Ns), so as to follow the modulation amount specifying signal (Sm) transmitted from a host circuit (Uh).

The light emitting element aggregate (Ud) generates one output image (Kf) at the infinity by, for example, a B color semiconductor laser. In a phosphor wheel (Wc), a R color phosphor layer which emits a fluorescence of R color by irradiating it with light from a B color semiconductor laser, a G color phosphor layer which emits a fluorescence of G color, and a layer which diffuses or transmits light of at least B color, are formed on a glass disk in a divided manner in a rotation direction. The phosphor wheel is driven by, for example, a motor whose rotation is controlled by PLL control, so as to rotate, following a rotation phase signal (Sp) from the host circuit (Uh). Light from the output image (Kf) is condensed to the phosphor wheel (Wc) as a bundle of rays which is suitable for its structure by, for example, a condensing optical system (Wf) made up of a convex lens. Light of R, G, and B, which is color-sequentially outputted by fluorescence, or diffusion/transmission from the phosphor wheel (Wc), is guided to an incident end of a light uniformizing unit (Fm), which is made up of, for example, an optical guide, by a capacitor optical system (Wi) which is formed by, for example, a convex lens, a concave mirror, or a combination of both.

Figure 16:
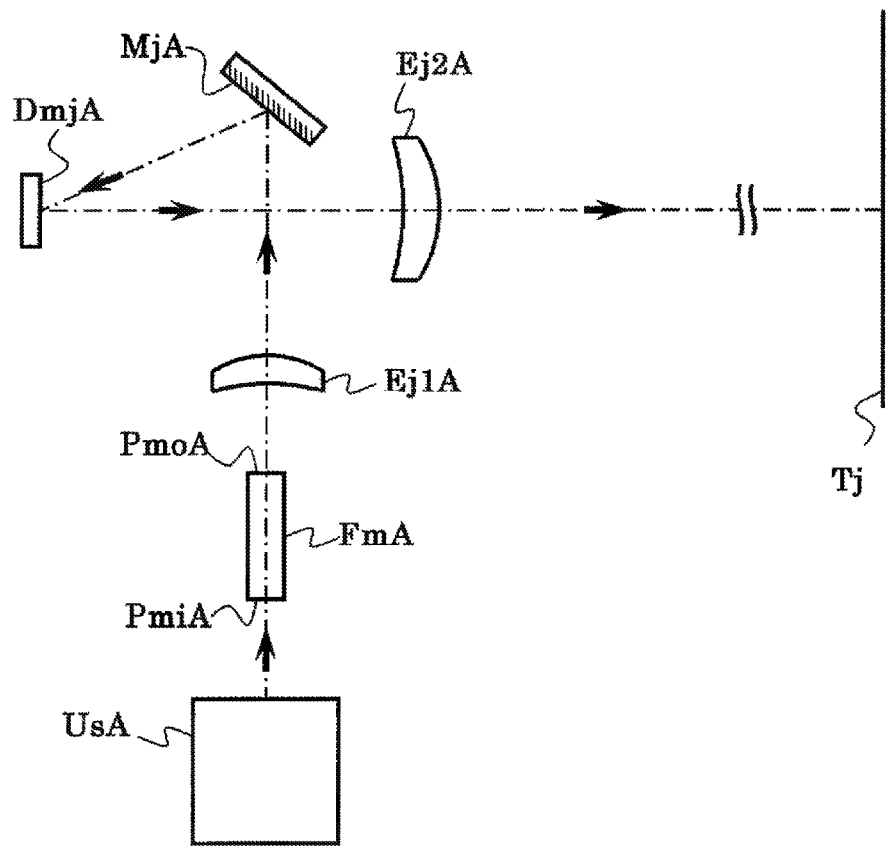
FIG. 16 is a principle diagram for explaining an aspect of part of a kind of a conventional projector, which relates to a projector according to the present invention.
Figure 17:
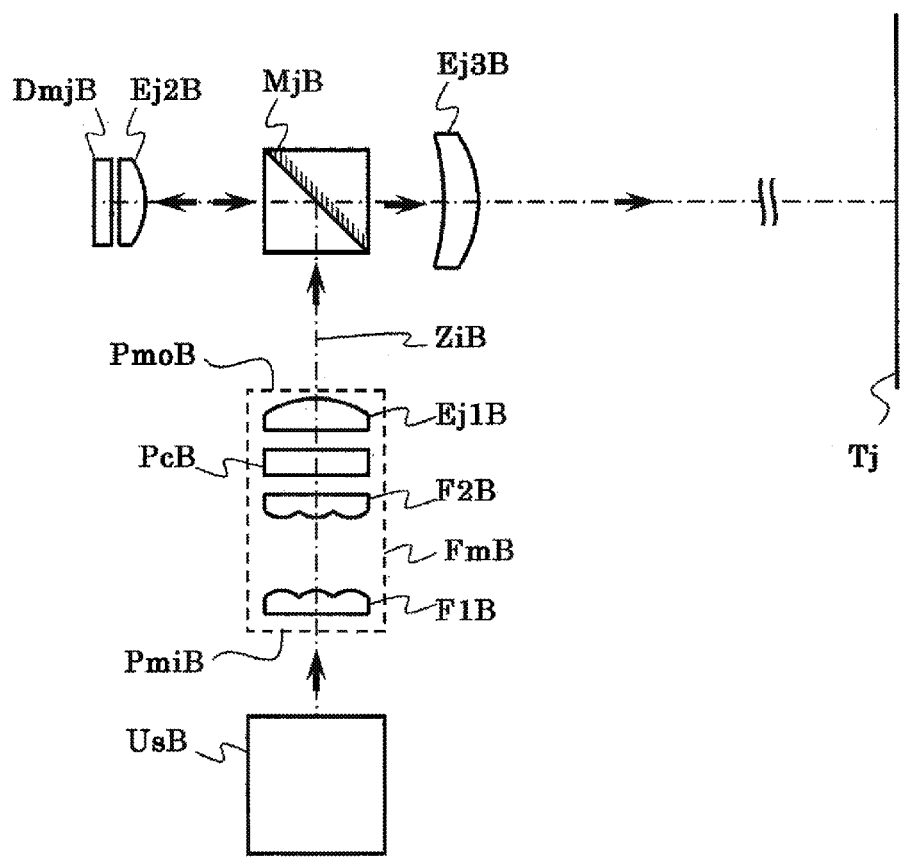
FIG. 17 is a principle diagram for explaining an aspect of part of a kind of a conventional projector, which relates to a projector according to an embodiment of the present invention.

Similarly to that explained with respect to FIG. 16, for example, a two-dimensional light amplitude modulation element (Dm), which uses, for example, a DMD, is uniformly illuminated, by forming an image from a quadrangular image at an emission end of the light uniformizing unit (Fm) by an illumination lens (Ej1). The two-dimensional light amplitude modulation element (Dm) modulates reflected light for every picture element according to an image signal (Sr) from the host circuit (Uh), and the image of the two-dimensional light amplitude modulation element (Dm) is projected on a screen (Tj) by a projection lens (Ej2).

Although the projector which uses the optical guide and the DMD is explained above, the present invention can be applied to a projector which uses a fly eye integrator, an LCOS and an LCD.

Moreover, although the case where a B color semiconductor laser is used as the light emitting element aggregate (Ud) is explained, for example, a semiconductor laser which emits, for example, ultraviolet rays may be used. In such case, a phosphor wheel (Wc), in which an R color phosphor layer which emits a fluorescence of R color by irradiating it with ultraviolet rays, a G color phosphor layer which emits a fluorescence of G color, and a B color phosphor layer which emits a fluorescence of B color, are formed on a glass disk in a divided manner in a rotation direction, can be applied therefor.

Further, it is possible to apply it for a device in which light of R, G, and B is color-sequentially outputted, if the host circuit (Uh) generates a color selection signal other than the modulation amount specifying signal (Sm), an interface circuit (Tx) generates a light source selection signal, which is electrically insulated from the color selection signal by using the color selection signal, in addition to the target current signal (Sj), and one of two or more light emitting element series connection circuits (Ns), which has a switching device and which are made up of solid light emitting elements whose luminescent color differs from each other, is selected according to the light source selection signal, and electric power is supplied thereto.

The present invention can be used in the industry of design and manufacturing of a projector and a light source apparatus using solid light emitting elements such as a semiconductor laser, which can be used in an optical device such as a projector.

The preceding description has been presented only to illustrate and describe exemplary embodiments of the present light source apparatus and projector. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A light source apparatus comprising:
   a light emitting element aggregate including two or more solid light emitting elements, and
   an electric supply circuit for supplying electric power to the light emitting element aggregate,
   wherein the light emitting element aggregate has a beam flux conversion optical system for making an light emitting area of each of all the solid light emitting elements conjugate to one geometrical-optical output image,
   wherein all the solid light emitting elements are in series connected to each other thereby forming a light emitting element series connection circuit, and are fixed to a heat sink (Hg) so as to be electrically insulated to each other,
   wherein the electric supply circuit has a converter circuit for stepping down an output voltage of a DC power supply connected to an upstream side of the electric supply circuit, the output voltage generated by the converter circuit is applied to the light emitting element series connection circuit, the converter circuit includes at least one switch element and a circuit on a input side thereof and a circuit on an output side thereof are not electrically insulated from each other,
   wherein the electric supply circuit further includes an output current detecting unit-which detects output current of the converter circuit flowing through the light emitting element series connection circuit, and generates an output current signal, an electric supply control circuit for controlling the converter circuit, and an interface circuit for receiving a modulation amount specifying signal from a host circuit,
   wherein the electric supply control circuit is configured to control a ratio of ON time to a switching cycle of the switch element in a feedback manner so that a difference between a current value which is indicated by the output current signal and a current value which is indicated by a target current signal inputted from the interface circuit may become small,
   wherein the interface circuit has a data insulation transmission unit for generating analog quantity, which is electrically insulated from the modulation amount specifying signal, and the interface circuit generates the target current signal for the analog quantity correlated to the amount of modulation specified by the modulation amount specifying signal, through the data insulation transmission unit,
   wherein the solid light emitting elements are configured so as to be covered with an external enclosure made up of a metal casing portion and a light transmission window portion,
   wherein the solid light emitting elements, the heat sink, and a fixing member are arranged so that the heat sink and the fixing member sandwich the metal casing portion, through a first insulating member and a second insulating member, from a light emitting side thereof and an opposite side thereto, and
   wherein the fixing member has elasticity, and the solid light emitting elements are fixed to the heat sink by fixing the fixing member to the heat sink.

2. The light source apparatus according to claim 1, wherein the beam flux conversion optical system is configured by collimating lenses provided so as to correspond to the respective solid light emitting elements, and lens holders to which the collimating lenses (Lz1, Lz2, . . . ) are fixed, are set on the metal casing portions, so that light parallel to a specific direction with respect to reference planes of the metal casing portions may be emitted.

3. The light source apparatus according to claim 2, wherein the lens holders serves as the first insulating members.

4. A light source apparatus comprising:
   a light emitting element aggregate including two or more solid light emitting elements, and
   an electric supply circuit for supplying electric power to the light emitting element aggregate,
   wherein the light emitting element aggregate has a beam flux conversion optical system for making an light emitting area of each of all the solid light emitting elements conjugate to one geometrical-optical output image,
   wherein all the solid light emitting elements are in series connected to each other thereby forming a light emitting element series connection circuit, and are fixed to a heat sink so as to be electrically insulated to each other,
   wherein the electric supply circuit has a converter circuit for stepping down an output voltage of a DC power supply connected to an upstream side of the electric supply circuit, the output voltage generated by the converter circuit is applied to the light emitting element series connection circuit, the output voltage applied to the light emitting element series connection circuit whose series connection number is a limit, is set so as to be approximately 80% of the output voltage of the DC power supply, the converter circuit includes at least one switch element, and a circuit on a input side thereof and a circuit on an output side thereof are not electrically insulated from each other,
   wherein the electric supply circuit further includes an output current detecting unit which detects output current of the converter circuit flowing through the light emitting element series connection circuit, and generates an output current signal, an electric supply control circuit for controlling the converter circuit, and an interface circuit for receiving a modulation amount specifying signal from a host circuit, wherein the electric supply control circuit is configured to control a ratio of ON time to a switching cycle of the switch element in a feedback manner so that a difference between a current value which is indicated by the output current signal and a current value which is indicated by a target current signal inputted from the interface circuit may become small, and wherein the interface circuit has a data insulation transmission unit for generating analog quantity, which is electrically insulated from the modulation amount specifying signal, and the interface circuit generates the target current signal for the analog quantity correlated to the amount of modulation specified by the modulation amount specifying signal, through the data insulation transmission unit.

5. The light source apparatus according to claim 4, wherein the solid light emitting elements are configured in a shape of a chip, the solid light emitting elements are fixed to an insulation material base plate, and the insulation material base plate is fixed to the heat sink.

6. A projector comprising the light source apparatus according to claim 1, wherein an image is projected and displayed by using the light source apparatus.

7. A projector comprising the light source apparatus according to claim 2, wherein an image is projected and displayed by using the light source apparatus.

8. A projector comprising the light source apparatus according to claim 3, wherein an image is projected and displayed by using the light source apparatus.

9. A projector comprising the light source apparatus according to claim 4, wherein an image is projected and displayed by using the light source apparatus.

10. A projector comprising the light source apparatus according to claim 5, wherein an image is projected and displayed by using the light source apparatus.

11. The projector according to claim 6, wherein the DC power supply generates output voltage by converting commercial power, and the output of the DC power supply is not electrically insulated from the commercial power source.

12. The projector according to claim 7, wherein the DC power supply generates output voltage by converting commercial power, and the output of the DC power supply is not electrically insulated from the commercial power source.

13. The projector according to claim 8, wherein the DC power supply generates output voltage by converting commercial power, and the output of the DC power supply is not electrically insulated from the commercial power source.

14. The projector according to claim 9, wherein the DC power supply generates output voltage by converting commercial power, and the output of the DC power supply is not electrically insulated from the commercial power source.

15. The projector according to claim 10, wherein the DC power supply generates output voltage by converting commercial power, and the output of the DC power supply is not electrically insulated from the commercial power source.

* * * * *